United States Patent
Kim et al.

(10) Patent No.: US 10,778,039 B2
(45) Date of Patent: Sep. 15, 2020

(54) COIL DEVICE FOR WIRELESS POWER TRANSMISSION

(71) Applicant: Samsung Electronics Co., Ltd., Gyeonggi-do (KR)

(72) Inventors: Yong-Youn Kim, Gyeonggi-do (KR); Dong-Il Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 16/170,544

(22) Filed: Oct. 25, 2018

(65) Prior Publication Data
US 2019/0123588 A1 Apr. 25, 2019

(30) Foreign Application Priority Data

Oct. 25, 2017 (KR) .................. 10-2017-0139609

(51) Int. Cl.
*H02J 7/02* (2016.01)
*H04B 5/00* (2006.01)
(Continued)

(52) U.S. Cl.
CPC .............. *H02J 50/12* (2016.02); *H01F 27/40* (2013.01); *H01F 38/14* (2013.01); *H02J 7/025* (2013.01);
(Continued)

(58) Field of Classification Search
CPC ........... H02J 50/12; H02J 7/025; H01F 27/40; H01F 38/14; H04B 5/0037; H04B 5/0081
See application file for complete search history.

(56) References Cited

U.S. PATENT DOCUMENTS 9,941,743 B2* 4/2018 Peralta ................. H01F 38/14
2014/0210407 A1 7/2014 Won et al.
(Continued)

FOREIGN PATENT DOCUMENTS

KR 1020130032293 4/2013
KR 1020130101245 9/2013
(Continued)

OTHER PUBLICATIONS

International Search Report dated Jan. 22, 2019 issued in counterpart application No. PCT/KR2018/012743, 7 pages.

*Primary Examiner* — Robert L Deberadinis
(74) *Attorney, Agent, or Firm* — The Farrell Law Firm, P.C.

(57) ABSTRACT

A coil device for transmitting wireless power includes at least one switch, a first coil, a second coil configured to be physically connected to the first coil through the at least one switch, a third coil configured to be physically connected to the first coil through the at least one switch, and a logic circuit configured to control the at least one switch. In a first mode, the logic circuit is configured to control the at least one switch so that an inductance of the first coil is a first inductance and control the at least one switch so that the first coil and the second coil are connected to each other and the first coil and the third coil are not connected to each other. In a second mode, the logic circuit is configured to control the at least one switch so that the inductance of the first coil is a second inductance and control the at least one switch so that the first coil and the third coil are connected to each other and the first coil and the second coil are not connected to each other.

20 Claims, 24 Drawing Sheets

(51) Int. Cl.
　　　*H02J 50/12*　　　(2016.01)
　　　*H01F 38/14*　　　(2006.01)
　　　*H01F 27/40*　　　(2006.01)
(52) U.S. Cl.
　　　CPC ......... *H04B 5/0037* (2013.01); *H04B 5/0081* (2013.01)

(56)　　　　　References Cited

U.S. PATENT DOCUMENTS

2015/0137749  A1　　5/2015　Park
2016/0020633  A1　　1/2016　Han et al.
2018/0301805  A1*　10/2018　Mikawa .................. H01Q 3/24

FOREIGN PATENT DOCUMENTS

KR　　1020150057783　　5/2015
KR　　1020150069254　　6/2015
KR　　1020170010595　　2/2017

* cited by examiner

COIL DEVICE FOR WIRELESS POWER TRANSMISSION

CROSS-REFERENCE TO RELATED APPLICATION(S)

This application is based on and claims priority under 35 U.S.C. § 119(a) to Korean Patent Application No. 10-2017-0139609, which was filed on Oct. 25, 2017, in the Korean Intellectual Property Office, the disclosure of which is incorporated by reference herein in its entirety.

BACKGROUND

1. Field

The present disclosure relates generally to a coil device for wireless power transmission.

2. Description of Related Art

With the development of wireless charging technology, a method of supplying power to various electronic devices by using a single rechargeable device has been researched.

Wireless charging technology generally uses wireless power transmission and reception, and may refer to, for example, a system in which the battery of an electronic device can be automatically charged by simply placing the electronic device on a rechargeable pad without connecting the electronic device to a separate (i.e., wired) charging connector.

Wireless charging technology includes, for example, an electromagnetic induction scheme using a coil, a resonance scheme using resonance, and a radio frequency (RF)/micro wave radiation scheme of converting electrical energy into a microwave and transmitting the converted result.

A power transmission method by wireless charging is a method of transmitting power between a first coil of a transmission terminal and a second coil of a reception terminal. The transmission terminal generates a magnetic field, and in the reception terminal, a current is induced and resonates according to a change in the magnetic field, generating energy.

Recently, wireless charging technology using an electromagnetic induction scheme or a magnetic resonance scheme has been expanded to electronic devices such as smart phones. When a power transmitting unit (PTU) (e.g., a wireless rechargeable pad) and a power receiving unit (PRU) (e.g., a smart phone) come into contact with each other or approach each other within a certain distance, the battery of the PRU can be charged by electromagnetic induction or electromagnetic resonance between a transmission coil of the PTU and a reception coil of the PRU.

An electronic device (e.g., a smart phone) may perform a function of charging the battery of the electronic device using power received from a power transmitting unit (PTU) (e.g., a wireless rechargeable pad). Thus, it may be advantageous to provide a coil device that can be used to receive or transmit wireless power and an accessory device that includes the coil device.

For example, a coil device, an accessory device, and an electronic device which can implement techniques for charging the battery of an electronic device using power received from a PTU and for transmitting power stored in the battery of the electronic device to another electronic device to charge the battery of the other electronic device may advantageously be provided.

SUMMARY

The present disclosure has been made to address the above-mentioned problems and disadvantages, and to provide at least the advantages described below.

In accordance with an aspect of the present disclosure, a coil device for transmitting wireless power is provided that includes at least one switch; a first coil; a second coil configured to be physically connected to the first coil through the at least one switch; a third coil configured to be physically connected to the first coil through the at least one switch; and a logic circuit configured to control the at least one switch, wherein, in a first mode, the logic circuit is configured to control the at least one switch so that an inductance of the first coil is a first inductance and controls the at least one switch so that the first coil and the second coil are connected to each other and the first coil and the third coil are not connected to each other, and in a second mode, the logic circuit is configured to control the at least one switch so that the inductance of the first coil is a second inductance and control the at least one switch so that the first coil and the third coil are connected to each other and the first coil and the second coil are not connected to each other.

In accordance with another aspect of the present disclosure, an accessory device for covering an electronic device is provided that includes a cover unit. The cover unit is configured to include a first cover for covering at least a portion of a first surface of the electronic device, a second cover for covering at least a portion of a second surface of the electronic device positioned opposite the first surface, and a connection portion for connecting the first cover and the second cover. The accessory device also includes a first coil and a second coil configured to be disposed inside the first cover; a third coil configured to be disposed inside the second cover; and a circuit unit configured to be electrically connected to the first coil, the second coil, and the third coil.

In accordance with another aspect of the present disclosure, an accessory device for covering an electronic device is provided that includes a case configured to house the electronic device and to cover at least a portion of a first surface of the electronic device; a first coil configured to be disposed inside the case; a second coil configured to be spaced apart from the first coil in the case and to be positioned below the first coil; and a connection portion configured to physically connect the first coil and the second coil.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
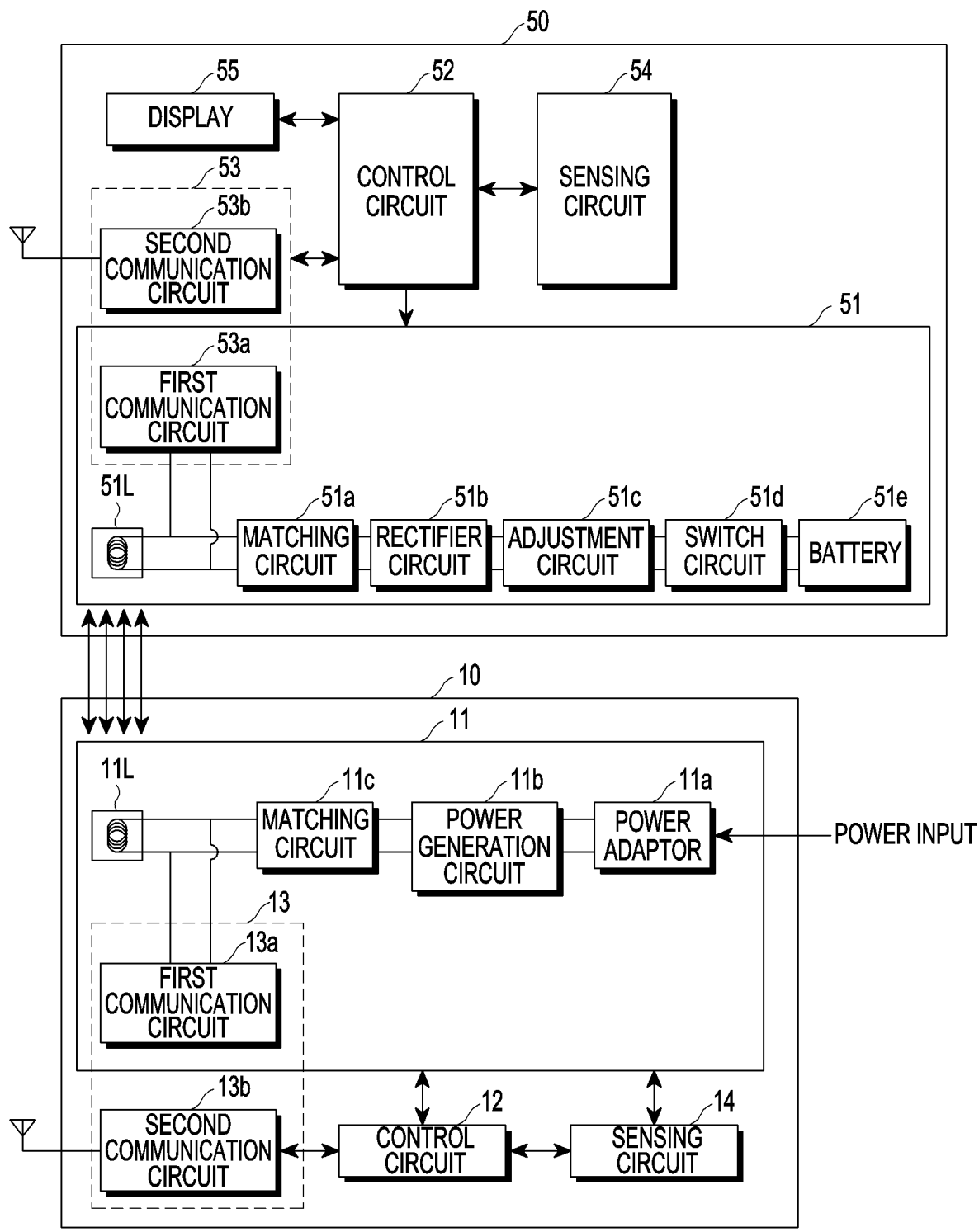
FIG. 1 is a block diagram illustrating a wireless PTU and an electronic device capable of wirelessly receiving power, according to an embodiment.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The expression "configured to", as used in various embodiments, may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrases "processor adapted to perform A, B, and C" and "processor configured to perform A, B, and C" may mean a dedicated processor (e.g., an embedded processor) only for performing the corresponding operations or a generic-purpose processor (e.g., central processing unit (CPU) or application processor (AP)) that can perform the corresponding operations by executing one or more software programs stored in a memory device.

According to an embodiment, an electronic device may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 (MPEG-1) audio layer-3 (MP3) player, a mobile medical device, a camera, and a wearable device. The wearable device may include at least one of an accessory type device (e.g., a watch, a ring, a bracelet, an anklet, a necklace, glasses, a contact lens, or a head-mounted device (HMD)), a fabric or clothing integrated type device (e.g., an electronic clothing), a body-mounted type device (e.g., a skin pad or a tattoo), and a bio-implantable type device (e.g., an implantable circuit). The electronic device may include at least one of a television, a digital video disk (DVD) player, an audio device, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment, the electronic device may include at least one of various medical devices (e.g., various portable medical measuring devices, such as a blood glucose monitoring device, a heart rate monitoring device, a blood pressure measuring device, and a body temperature measuring device), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), vehicle infotainment devices, an electronic device for a ship (e.g., a navigation device and a gyro-compass), avionics, security devices, an automotive head unit, an industrial or home robot, an automatic teller machine (ATM) in banks, point of sales (POS) device, or an Internet of things (IoT) device (e.g., a light bulb, various sensors, an electric or gas meter, a sprinkler device, a fire alarm, a thermostat, a streetlamp, a toaster, exercise equipment, a hot water tank, a heater, and a boiler).

Additionally, an electronic device may include at least a part of furniture or a building/structure, an electronic board, an electronic signature receiving device, a projector, and various types of measuring instruments (e.g., a water meter, an electric meter, a gas meter, and a radio wave meter). The electronic device may be flexible, or may be a combination of one or more of the aforementioned various devices.

According to an embodiment, the electronic device is not limited to the above described devices. The term "user" may indicate a person using an electronic device or a device (e.g., an artificial intelligence electronic device) using an electronic device. An electronic device is not limited as long as it can wirelessly transmit or receive power using wireless charging technology.

The wireless charging technology uses wireless power transmission and reception, and may refer to a system in which the battery of an electronic device (e.g., a smart phone) can be charged without connecting the electronic device to a separate charging connector. The wireless charging technology may increase the portability of an electronic device because there is no need for a separate external device (e.g., a terminal or travel adapter (TA)) for charging the electronic device, and may improve a waterproof function because there is no port associated with a connector for connecting the electronic device to an external device.

A wireless PTU may transmit power to a wireless PRU, using one or more of an inductive coupling scheme based on an electromagnetic induction phenomenon generated by a wireless power signal and an electromagnetic resonance coupling scheme based on an electromagnetic resonance phenomenon generated by a wireless power signal of a specific frequency.

A method of transmitting wireless power by electromagnetic induction is a technique of wirelessly transmitting power using a primary coil (or a primary conductive pattern) and a secondary coil (or a secondary conductive pattern), and may mean that a current is induced to the secondary coil by a magnetic field generated in the primary coil due to an electromagnetic induction phenomenon so that power is transmitted.

In a method of transmitting wireless power by the resonance coupling scheme, electromagnetic resonance is generated in an electronic device by a wireless power signal transmitted from a wireless PTU and power is transmitted from the wireless PTU to the electronic device by the resonance phenomenon.

According to various embodiments, when a voltage or current flowing through a primary coil within a wireless PTU is changed during power transmission of the wireless PTU, a magnetic field passing through the primary coil may be changed by the current. The changed magnetic field may generate an electromotive force on a secondary coil side within a wireless PRU. At this time, the efficiency of wireless power transmission may be affected by the alignment and distance between the wireless PTU and PRU including the respective coils. Meanwhile, for the wireless power transmission, the wireless PTU may be configured to include an interface surface in the form of a flat surface. One or more electronic devices may be placed on the top of the interface surface, and a transmission coil may be mounted on the bottom of the interface surface. In addition, an alignment indicator indicating a position where the electronic device is to be placed may be provided on the top of the interface surface. The alignment indicator may indicate the position of the electronic device so that the alignment between a transmission coil mounted on the bottom of the interface surface and a reception coil of the electronic device can be made appropriately.

The alignment indicator may include simple marks. The alignment indicator may be provided in the form of a protruding structure for guiding the position of the electronic device. Further, the alignment indicator may be provided in the form of a magnetic body such as a magnet mounted on the bottom of the interface surface, and may guide the coils to be appropriately aligned by mutual attraction with another magnetic body of the opposite polarity mounted inside the electronic device.

A wireless PTU or a wireless PRU (e.g., an electronic device) may output feedback according to the alignment state to improve charging efficiency. The feedback may include a voice message, a predetermined sound effect, vibration, a text message, or a moving picture showing an example of correcting the alignment through a display.

The wireless PTU may include one or more transmission coils. The wireless PTU may selectively use some of coils suitably aligned for the reception coil of the electronic device among the one or more transmission coils to increase the power transmission efficiency. In addition, the transmission coil may be a movable type coil. When the position of the wireless PRU (e.g., an electronic device) is determined through a position sensing unit, the wireless PTU may move the transmission coil so that a distance between the centers of the transmission coil and the reception coil is within a predetermined range. In addition, the wireless PTU may include a driving unit for rotating the transmission coil so that the centers of the transmission coil and the reception coil overlap with each other. The wireless PTU may further include a multiplexer for establishing and releasing a connection of some of the one or more transmission coils. When the position of the wireless PRU placed on the top of the interface surface is detected, the multiplexer may be controlled in such a manner that conductive patterns that can have an inductive or resonance coupling relationship with the reception coil of the wireless PRU among the one or more transmitting coils can be connected in consideration of the detected position.

A power conversion unit of the wireless PTU may be configured to include one or more transmission coils and a resonance forming circuit connected to each of the transmission coils. In addition, the power conversion unit may further include a multiplexer for establishing and releasing a connection of at least one of the one or more transmission coils. The one or more transmission coils may be set to have the same resonance frequency. Alternatively, at least one of the one or more transmission coils may be set to have a different resonance frequency, which may determine what inductance and/or capacitance the resonance forming circuits connected to the one or more transmission coils have.

The electronic device may be configured to perform both the functions of the wireless PTU and the wireless PRU. The electronic device may separately include a transmission coil and a reception coil, and may use one coil for transmission and reception. The electronic device may be coupled to other accessory devices to perform both the functions of the wireless PTU and the wireless PRU. For example, an accessory device that can be coupled to an electronic device may mediate wireless power transmission and reception between the wireless PTU and the electronic device, and may perform a function of transmitting power received from the wireless PTU to the electronic device. In addition, an accessory device that can be coupled to an electronic device may mediate wireless power transmission and reception between another electronic device and the electronic device, and may perform a function of transmitting power generated from the electronic device to the other electronic device.

FIG. 1 is a block diagram illustrating a wireless PTU and an electronic device capable of wirelessly receiving power, according to an embodiment.

Referring to FIG. 1, a wireless PTU 10 includes at least one of a power transmission circuit 11, a control circuit 12, a communication circuit 13, and a sensing circuit 14. An electronic device 50 capable of wirelessly receiving power includes at least one of a power reception circuit 51, a control circuit 52, a communication circuit 53, a sensing circuit 54, and a display 55.

The power transmission circuit 11 may provide power to the electronic device 50. The power transmission circuit 11 includes a power adapter 11a, a power generation circuit 11b, a matching circuit 11c, a coil (or a conductive pattern) 11L, or a first communication circuit 13a. The power transmission circuit 11 may be configured to transmit power to the electronic device 50 wirelessly via the coil 11L. The power transmission circuit 11 may be supplied with power in the form of a direct current (DC) or alternating current (AC) waveform from the outside and may supply the supplied power to the electronic device 50 in the form of an AC waveform. The coil 11L may include a plurality of coils.

The power adapter 11a may receive AC power or DC power from the outside or may receive a power signal of a built-in battery device to output DC power having a predetermined voltage value. The voltage value of the DC power output from the power adapter 11a may be controlled by the control circuit 12. The DC power output from the power adapter 11a may be output to the power generation circuit 11b.

The power generation circuit 11b may convert the DC power (DC current) output from the power adapter 11a into AC power (AC current) and output the converted result. The power generation circuit 11b may include a predetermined amplifier. For example, when a DC voltage or current input through the power adapter 11a is smaller than a predetermined gain, the DC voltage or current may be amplified to a predetermined value using the amplifier. The power generation circuit 11b may include a circuit for converting a DC current input from the power adapter 11a into an AC current based on a control signal input from the control circuit 12. The power generation circuit 11b may include a bridge circuit including a plurality of switches. The power generation circuit 11b may convert the DC current into the AC current through a predetermined inverter. The power generation circuit 11b may include a gate driving device. The gate driving device may change the DC current to the AC current while controlling the DC current to be turned on/off. Alternatively, the power generation circuit 11b may generate an AC current through a wireless power generator (e.g., an oscillator).

The matching circuit 11c may perform impedance matching. For example, when a signal of the AC current output from the power generation circuit 11b is transmitted to the coil 11L, an electromagnetic field may be formed in the coil 11L by the signal of the AC current. The frequency band of the formed electromagnetic field may be adjusted by adjusting the impedance of the matching circuit 11c. The matching circuit 11c may adjust the impedance so that output power transmitted to the electronic device 50 through the coil 11L has a high efficiency or a high output. The matching circuit 11c may adjust the impedance based on the control of the control circuit 12. The matching circuit 11c may include at least one of an inductor (e.g., a coil), a capacitor, and a switch device. The control circuit 12 may control the connection state with at least one of the inductor and the capacitor through the switch device, thereby performing impedance matching. At least one of the control circuit 12 and the control circuit 52 may be implemented in various circuits capable of performing operations of a general-purpose processor such as a CPU, a minicomputer, a microprocessor, a micro controlling unit (MCU), and a field programmable gate array (FPGA), as well as other processing technologies.

The coil 11L may form a magnetic field for inducing or resonating a current to the electronic device 50 when a current is applied to the coil 11L. The first communication circuit 13a (e.g., a resonance circuit) may perform communication (e.g., data communication) in an in-band format using electromagnetic waves generated by the coil 11L.

The sensing circuit 14 may sense a change in a current/voltage applied to the coil 11L of the power transmission circuit 11. In the wireless PTU 10, an amount of power to be transmitted may be changed according to the change in the current/voltage applied to the coil 11L. Alternatively, the sensing circuit 14 may sense a change in the temperature of the wireless PTU 10.

According to an embodiment, the sensing circuit 14 may include at least one of a current/voltage sensor and a temperature sensor. One of the sensing circuits 14, for example the current/voltage sensor, may be included in the power transmission circuit 11, and the temperature sensor may be disposed outside the power transmission circuit 11.

The control circuit 12 may control wirelessly power transmission to the electronic device 50 via the power transmission circuit 11. The control circuit 12 may control wireless power transmission or receive information to and from the electronic device 50 via the communication circuit 13.

The received information may include at least one of charging setting information associated with the battery state of the electronic device 50, power amount control information associated with the adjustment of the amount of power transmitted to the electronic device 50, environment information associated with the charging environment of the electronic device 50, and time information of the electronic device 50.

The charging setting information may be information associated with the battery state of the electronic device 50 at the wireless charging time between the wireless PTU 10 and the electronic device 50. For example, the charging setting information may include information of at least one of a full capacity of a battery, a residual capacity of a battery, a charging frequency, a battery usage amount, a charging mode, a charging scheme, and a wireless reception frequency band of the electronic device 50.

The power amount control information may be information for controlling the amount of initial power transmitted according to a change in the amount of power charged in the electronic device 50 during wireless charging between the wireless PTU 10 and the electronic device 50.

The environment information may be information obtained by measuring the charging environment of the electronic device 50 using the sensing circuit 54 of the electronic device 50. For example, the environment information may include information of at least one of temperature data including at least one of the internal and external temperatures of the electronic device 50, illumination data representing the illuminance (brightness) around the electronic device 50, and sound data representing sound (noise) around the electronic device 50.

The control circuit 12 may be controlled to generate or transmit power to be transmitted to the electronic device 50 based on the charging setting information among the plurality of pieces of received information. Alternatively, the control circuit 12 may determine or change the amount of power transmitted to the electronic device 50 based on at least some of the plurality of pieces of received information (e.g., at least one of the power amount control information, the environment information, and the time information). Alternatively, the control circuit 12 may control the matching circuit 11c to change the impedance.

The communication circuit 13 may perform communication with the electronic device 50 in a predetermined manner. The communication circuit 13 may perform data communication with a communication circuit 53 of the electronic device 50. For example, the communication circuit 13 may unicast, multicast, or broadcast the signal.

According to an embodiment, the communication circuit 13 may include at least one of the first communication circuit 13a that is implemented as hardware with the power transmission circuit 11 so that the wireless PTU 10 can perform communication in an in-band format, and the second communication circuit 13b that is implemented as hardware that is different from the power transmission circuit 11 so that the power PTU 10 can perform communication in an out-of-band format.

When the communication circuit 13 includes the first communication circuit 13a capable of performing communication in the in-band format, the first communication circuit 13a may receive the frequency and signal level of an electromagnetic field received via the coil 11L of the power transmission circuit 11. The control circuit 12 may decode the received frequency and signal level of the electromagnetic field to extract information received from the electronic device 50. Alternatively, the first communication circuit 13a may apply, to the coil 11L of the power transmission circuit 11, a signal for information of the wireless PTU 10 desired to be transmitted to the electronic device 50, or may add a signal for information of the wireless PTU 10 to an electromagnetic field generated by applying a signal output from the matching circuit 11c to the coil 11L to transmit the added signal to the electronic device 50. The control circuit 12 may control the connection state with at least one of the inductor and the capacitor of the matching circuit 11c to be changed and output through the on/off control of the switch device included in the matching circuit 11c.

When the communication circuit 13 includes the second communication circuit 13b capable of performing communication in the out-of-band format, the second communication circuit 13b may perform communication with the communication circuit 53 (e.g., a second communication circuit 53b) of the electronic device 50 using near field communication (NFC), Zigbee™ communication, infrared (IR) communication, visible light communication, Bluetooth™ communication, or a Bluetooth™ low energy (BLE) scheme.

The above-mentioned communication schemes of the communication circuit 13 are merely examples, and the embodiments are not limited to a specific communication scheme performed by the communication circuit 13.

According to an embodiment, the electronic device 50 includes a power reception circuit 51, a control circuit 52, a communication circuit 53, a sensing circuit 54, or a display 55. The power reception circuit 51 of the electronic device 50 may receive power from the power transmission circuit 11 of the wireless PTU 10. The power reception circuit 51 may be implemented in the form of an embedded battery, or may be implemented in the form of a power reception interface to receive power from the outside. The power reception circuit 51 may include a matching circuit 51a, a rectifier circuit 51b, an adjustment circuit 51c, a switch circuit 51d, a battery 51e, or a coil 51L.

The power reception circuit 51 may receive, via the coil 51L, wireless power in the form of electromagnetic waves generated to correspond to a current/voltage applied to the coil 11L of the power transmission circuit 11. For example, the power reception circuit 51 may receive power using an electromotive force formed in the coil 11L of the power transmission circuit 11 and the coil 51L of the power reception circuit 51.

The matching circuit 51a may perform impedance matching. For example, the power transmitted via the coil 11L of the wireless PTU 10 may be transmitted to the coil 51L to form an electromagnetic field. The matching circuit 51a may adjust the frequency band of the formed electromagnetic field by adjusting the impedance. The matching circuit 51a may adjust the impedance in such a manner that input power received from the wireless PTU 10 via the coil 51L has a high efficiency and a high output. The matching circuit 51a may adjust the impedance based on the control of the control circuit 52. The matching circuit 51a may include at least one of an inductor (e.g., a coil), a capacitor, and a switch device. The control circuit 52 may control the connection state with at least one of the inductor and the capacitor through the switch device, thereby performing impedance matching.

The rectifier circuit 51b may rectify wireless power received at the coil 51L in the form of DC, and may be implemented, for example, in the form of a bridge diode.

The adjustment circuit 51c may convert the rectified power into a predetermined voltage or current. The adjustment circuit 51c may include a DC/DC converter. For example, the adjustment circuit 51c may convert the rectified power so that the voltage of an output terminal becomes 5V. A maximum value or minimum value of an applicable voltage may be set in the front end of the adjustment circuit 51c.

The switch circuit 51d may connect the adjustment circuit 51c and the battery 51e. The switch circuit 51d may maintain the on/off state according to the control of the control circuit 52.

The battery 51e may be charged by receiving power input from the adjustment circuit 51c. According to an embodiment, a charger may be further disposed between the switch circuit 51d and the battery 51e. The charger may charge the battery 51e by changing the voltage or current of power received in a predetermined mode (e.g., a constant current (CC) mode or a constant voltage (CV) mode). A DC/DC converter of the adjustment circuit 51e may directly charge the battery 51e, or the charger may charge the battery 51e by again adjusting power output from the adjustment circuit 51c.

The sensing circuit 54 may sense a change in the state of power received at the electronic device 50. For example, the sensing circuit 54 may periodically or non-periodically sense a current/voltage value received at the coil 51L via a predetermined current/voltage sensor. The electronic device 50 may calculate an amount of power received at the electronic device 50 based on the measured current/voltage. One of the sensing circuits 54, for example the current/ voltage sensor, may be included in the power reception circuit 51, and the other thereof, for example the temperature sensor, may be disposed outside the power reception circuit 51. According to an embodiment, the power reception circuit 51 may further include a sensing circuit that can sense a state change of the power received at the electronic device 50. For example, the sensing circuit capable of sensing the power state change may periodically or non-periodically measure a current value or voltage value received at the coil 51L. The control circuit 52 may calculate the amount of power received at the electronic device 50 based on the measured current or voltage. In addition, the sensing circuit capable of sensing the power state change may detect a change in the current or voltage input to or output from the rectifier circuit 51b. The sensing circuit may also detect a change in the current or voltage input to or output from an overvoltage protection circuit, or may further detect a change in the current or voltage input to the adjustment circuit 51c. The sensing circuit may be capable of sensing the state change of the power and may include a current sensor or a voltage sensor.

The electronic device 50 may further include a sensing circuit capable of detecting a change in the state of the electronic device 50. For example, the sensing circuit capable of detecting the state change of the electronic device 50 may periodically or non-periodically detect a change in the temperature of the electronic device 50. The sensing circuit capable of detecting the state change of the electronic device 50 may periodically or non-periodically detect the movement of the electronic device 50. The sensing circuit capable of detecting the state change of the electronic device 50 may include one of a temperature sensor, a motion sensor, a positioning sensor, and a combination thereof.

The sensing circuit 54 may sense a change in the charging environment of the electronic device 50. For example, the sensing circuit 54 may periodically or non-periodically measure at least one of an internal and external temperature of the electronic device 50 through a predetermined temperature sensor.

The display 55 may display general information associated with the charging state of the electronic device 50. For example, the display 55 may display information of at least one of a full capacity of a battery, a residual capacity of a battery, a battery charge amount, a battery usage amount, and an estimated charging time of the electronic device 50.

The communication circuit 53 may perform communication with the wireless PTU 10 in a predetermined scheme. The communication circuit 53 may perform data communication with the communication circuit 13 of the wireless PTU 10. The communication circuit 53 may operate in a manner similar to or the same as the communication circuit 13 of the wireless PTU 10. The communication circuit 53 may include at least one of a first communication circuit 53a that is implemented with the power reception circuit 51 as hardware so that the electronic device 50 can perform communication in an in-band format, and a second communication circuit 53b that is implemented as hardware different from the power reception circuit 51 so that the electronic device 50 can perform communication in an out-of-band format.

The control circuit 52 may transmit the charging setting information for receiving a required amount of power to the wireless PTU 10 based on information associated with the battery state of the electronic device 50 through the communication circuit 53. For example, when the wireless PTU 10 capable of transmitting wireless power is identified, the control circuit 52 may transmit the charging setting information for receiving the required amount of power to the wireless PTU 10 through the communication circuit 53, based on information of at least one of a full capacity of a battery, a residual capacity of a battery, a charging frequency, a battery usage amount, a charging mode, a charging scheme, and a wireless reception frequency band.

The control circuit 52 may transmit, to the wireless PTU 10, the power amount control information for controlling an amount of power received from the wireless PTU 10 according to a change in the amount of power charged in the electronic device 50 through the communication circuit 53. The first communication circuit 53a may include a switch, a capacitor, or a resistor. The control circuit 52 may turn on/off the switch according to a binary code of data to be transmitted, based on an on/off keying modulation scheme. In the impedance sensed in the wireless PTU 10, a change in the magnitude of power or the magnitude of a current in the power transmission circuit 11 may be detected according to an ON/OFF state of the switch and the detected change may be demodulated into a binary code so that data desired to be transmitted by the electronic device 50 may be obtained.

The control circuit 52 may transmit the environment information according to a change in the charging environment of the electronic device 50 to the wireless PTU 10. For example, when a temperature data value measured by the sensing circuit 54 is equal to or higher than a predetermined temperature reference value, the control circuit 52 may transmit the measured temperature data to the wireless PTU 10.

In FIG. 1, the wireless PTU 10 and the electronic device 50 include only the power transmission circuit 11 and the power reception circuit 51, respectively, but each of the wireless PTU 10 and the electronic device 50 may include both the power transmission circuit 11 and the power reception circuit 51. Accordingly, the wireless PTU 10 and the electronic device 50 may perform both the functions of the power PTU and the electronic device.

Figure 2A:
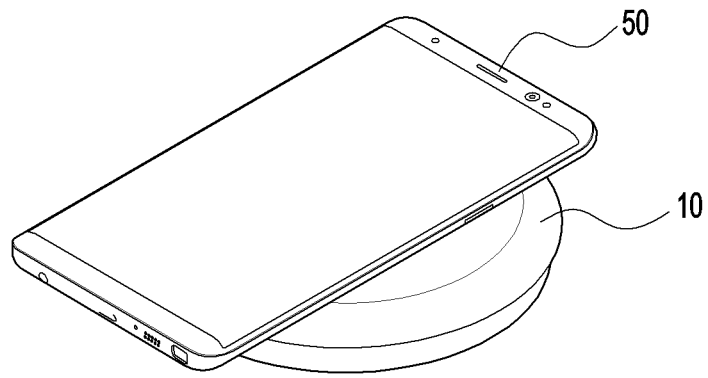
FIGS. 2A and 2B are conceptual diagrams illustrating a wireless PTU and an electronic device, according to an embodiment.
Figure 2B:
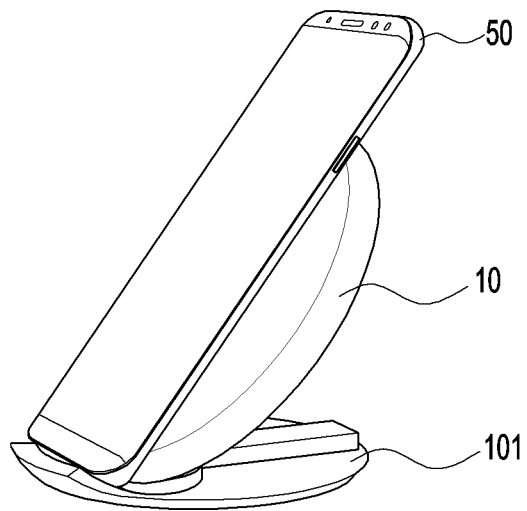

FIGS. 2A and 2B are conceptual diagrams illustrating a wireless PTU and an electronic device, according to an embodiment.

As shown in FIG. 2A, the wireless PTU 10 includes a housing having a form capable of supporting, for example, the electronic device 50. The electronic device 50 may be disposed on the wireless PTU 10. At least one of the components of the wireless PTU 10 described in FIG. 1 may be disposed in the housing of the wireless PTU 10.

As shown in FIG. 2B, the wireless PTU 10 may be operated to stand at a predetermined angle with respect to the ground by, for example, a support 101. As the wireless PTU 10 stands at the predetermined angle with respect to the ground, the electronic device 50 may perform charging while also standing at a predetermined angle with respect to the ground.

According to an embodiment, a coil device for transmitting wireless power may include at least one switch; a first coil; a second coil configured to be physically connected to the first coil through the at least one switch; a third coil configured to be physically connected to the first coil through the at least one switch; and a logic circuit configured to control the at least one switch, wherein, in a first mode, the logic circuit is configured to control the at least one switch so that an inductance of the first coil is a first inductance and controls the at least one switch so that the first coil and the second coil are connected to each other and the first coil and the third coil are not connected to each other, and in a second mode, the logic circuit is configured to control the at least one switch so that the inductance of the first coil is a second inductance and control the at least one switch so that the first coil and the third coil are connected to each other and the first coil and the second coil are not connected to each other.

In the coil device for transmitting wireless power, the logic circuit may control the at least one switch according to one of the first mode and the second mode based on a control signal received from an external electronic device.

In the coil device for transmitting wireless power according to various embodiments, the control signal may include a signal generated by a communication module of the external electronic device.

In the coil device for transmitting wireless power, a magnitude of the first inductance may be different from a magnitude of an inductance of the second coil.

In the coil device for transmitting wireless power, a magnitude of the second inductance may be different from a magnitude of an inductance of the third coil.

In the coil device for transmitting wireless power, in the first mode, the second coil may generate a first induction current based on a first electromagnetic field received from outside the coil device, and the first coil may receive the first induction current generated by the second coil and transmit a second electromagnetic field to the outside.

In the coil device for transmitting wireless power, in the second mode, the first coil may generate a first induction current based on a first electromagnetic field received from outside the coil device, and the third coil may receive the first induction current generated by the first coil and transmit a second electromagnetic field to the outside.

The coil device for transmitting wireless power may further include at least one shielding layer configured to be disposed between a first plane including the first coil and a second plane including the second coil.

According to an embodiment, an accessory device for covering an electronic device may include a cover unit configured to include a first cover for covering at least a portion of a first surface of the electronic device, a second cover for covering at least a portion of a second surface of the electronic device positioned opposite the first plane, and a connection portion for connecting the first cover and the second cover; a first coil and a second coil configured to be disposed inside the first cover; a third coil configured to be disposed inside the second cover; and a circuit unit configured to be electrically connected to the first coil, the second coil, and the third coil.

In the accessory device for covering the electronic device, a first layer including the first coil and a second layer including the second coil may be disposed parallel to the inside of the first cover, and the first coil may be disposed closer to the first surface of the electronic device than the second coil.

The accessory device for covering the electronic device may further include at least one shielding layer configured to be disposed between the first coil and the second coil.

According to an embodiment, in the accessory device for covering the electronic device, the circuit unit may further include at least one switch and a logic circuit, and in a first mode, the logic circuit may control the at least one switch so that an inductance of the first coil is a first inductance and control the at least one switch so that the first coil and the second coil are connected to each other and the first coil and the third coil are not connected to each other, and in a second mode, the logic circuit may control the at least one switch so that the inductance of the first coil is a second inductance and control the at least one switch so that the first coil and the third coil are connected to each other and the first coil and the second coil are not connected to each other.

In the accessory device for covering the electronic device, the logic circuit may control the at least one switch according to one of the first mode and the second mode based on a control signal received from the electronic device.

In the accessory device for covering the electronic device, the control signal may include a signal generated by a communication module of the electronic device.

In the accessory device for covering the electronic device, the magnitude of the first inductance may be different from the magnitude of an inductance of the second coil.

In the accessory device for covering the electronic device, the magnitude of the second inductance may be different from the magnitude of an inductance of the third coil.

In the accessory device for covering the electronic device, the third coil may include one coil or a plurality of coils having different sizes.

In the accessory device for covering the electronic device, in the first mode, the second coil may generate a first induction current based on a first electromagnetic field received from outside the accessory device, and the first coil may receive the first induction current generated by the second coil, generate a second electromagnetic field, and transmit the generated second electromagnetic field to the electronic device.

In the accessory device for covering the electronic device, in the second mode, the first coil may generate a first induction current based on a first electromagnetic field received from the electronic device, and the third coil may receive the first induction current generated by the first coil, generate a second electromagnetic field, and transmit the generated second electromagnetic field to an external electronic device positioned on the second cover.

According to an embodiment, an accessory device for covering an electronic device may include a case configured to house the electronic device and to cover at least a portion of a first surface of the electronic device; a first coil configured to be disposed inside the case; a second coil configured to be spaced apart from the first coil in the case and to be positioned below the first coil; and a connection portion configured to physically connect the first coil and the second coil.

According to an embodiment, an accessory device may include a cover unit configured to include a first cover formed to cover at least a portion of a first surface of an electronic device, a second cover formed to cover a second surface of the electronic device positioned opposite the first surface, and a connection portion for connecting the first cover and the second cover. The accessory device may include a first coil and a second coil configured to be disposed inside the first cover; a third coil configured to be disposed inside the second cover; and a circuit unit configured to be electrically connected to the first coil, the second coil, and the third coil. The electronic device may select one of a first mode and a second mode according to a first input, control at least one switch of the coil device in response to the selection of the first mode so that an inductance of a first coil of the coil device is a first inductance, output a first signal for controlling the at least one switch so that the first coil and a second coil of the coil device are connected to each other and the first coil and a third coil of the coil device are not connected to each other, control the at least one switch in response to the selection of the second mode so that the inductance of the first coil is a second inductance, and output a second signal for controlling the at least one switch so that the first coil and the third coil are connected to each other and the first coil and the second coil are not connected to each other.

According to an embodiment, an accessory device for covering an electronic device may include a cover unit configured to include a first cover for covering at least a portion of a first surface of the electronic device, a second cover for covering at least a portion of a second surface of the electronic device positioned opposite the first surface, and a connection portion for connecting the first cover and the second cover. The accessory device may include a first coil and a second coil configured to be disposed inside the first cover, wherein a first end of the first coil and a first end of the second coil are connected to a first lead wire and a second end of the first coil and a second end of the second coil are connected to a second lead wire.

Figure 3A:
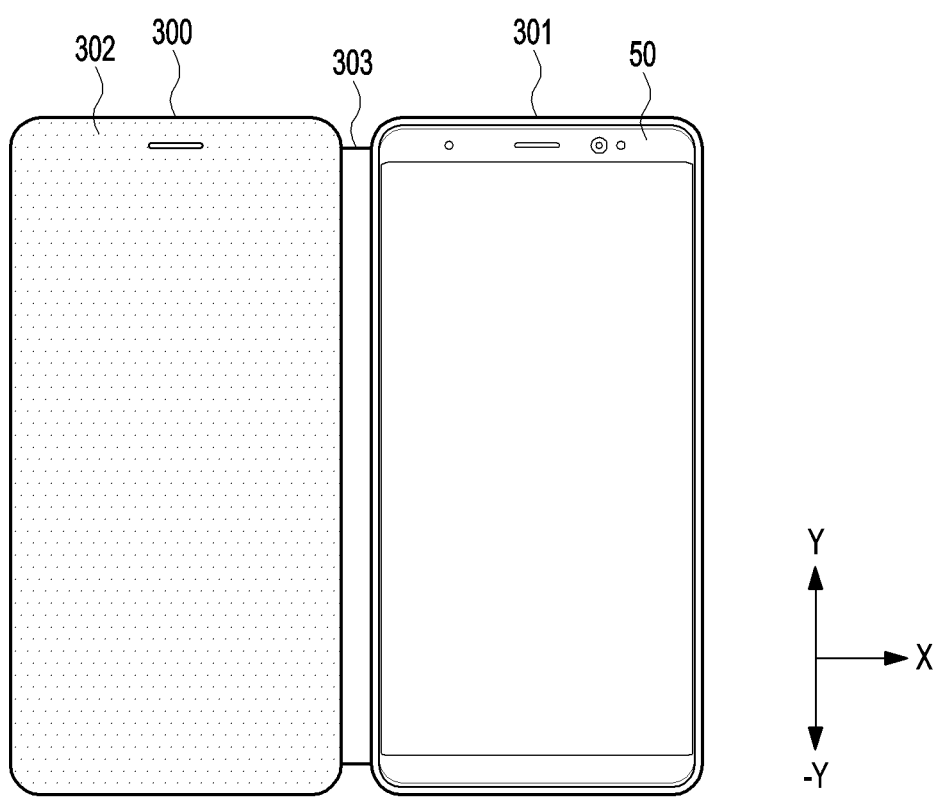
FIGS. 3A and 3B are diagrams illustrating an electronic device and an accessory device, according to an embodiment.
Figure 3B:
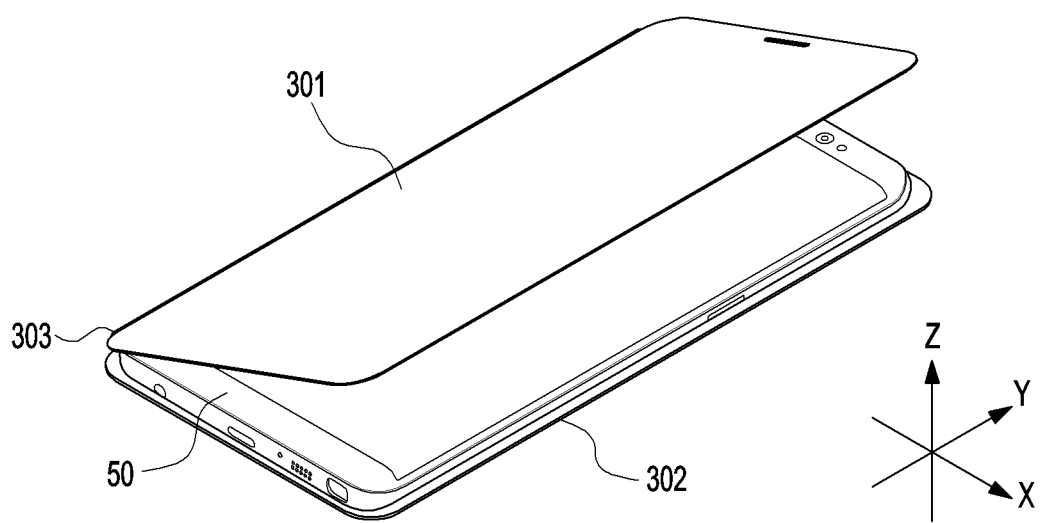

FIGS. 3A and 3B are diagrams illustrating an electronic device and an accessory device, according to an embodiment.

Referring to FIG. 3A, the electronic device 50 is coupled to an accessory device 300. The accessory device 300 may be coupled to the electronic device 50 so that the electronic device 50 can be used to transmit or receive wireless power. For example, the electronic device 50 may be coupled to the accessory device 300 via a case structure included in the accessory device 300 or various fasteners.

According to an embodiment, the accessory device 300 may include a coil device that can be used to transmit or receive wireless power by the electronic device 50. The accessory device 300 may mediate wireless power transmission and reception between the wireless PTU 10 and the electronic device 50 and may perform a function of transmitting power received from the wireless PTU 10 to the electronic device 50. In addition, the accessory device 300 may also mediate wireless power transmission and reception between another electronic device and the electronic device 50 and may perform a function of transmitting power generated by the electronic device 50 to the other electronic device.

Referring to FIG. 3B, the accessory device 300 may include a first cover 301 that covers at least a portion of a first surface of the electronic device 50. The accessory device 300 may include a second cover 302 that is connected to the first cover 301 by a connection portion 303 and covers at least a portion of a second surface of the electronic device 50 positioned opposite the first surface of the electronic device 50.

In order to protect the contour of the electronic device 50 from external shocks, the lateral/longitudinal lengths of the first cover 301 and the second cover 302 of the accessory device 300 may be provided to be equal to or longer than the lateral/longitudinal lengths of the electronic device 50 by at least a predetermined distance.

When the accessory device 300 is fastened to the electronic device 50, the first cover 301 may cover at least a portion of the first surface of the electronic device 50, and the second cover 302 may cover at least a portion of the second surface of the electronic device 50. The second surface of the electronic device 50 is a surface on which a display 30 of the electronic device 50 is disposed, and may refer to a front surface of the electronic device 50. In addition, the first surface of the electronic device 50 is a surface on which the battery and/or the coil 51L of the electronic device 50 is disposed, and may refer to a rear surface of the electronic device 50.

Figure 4A:
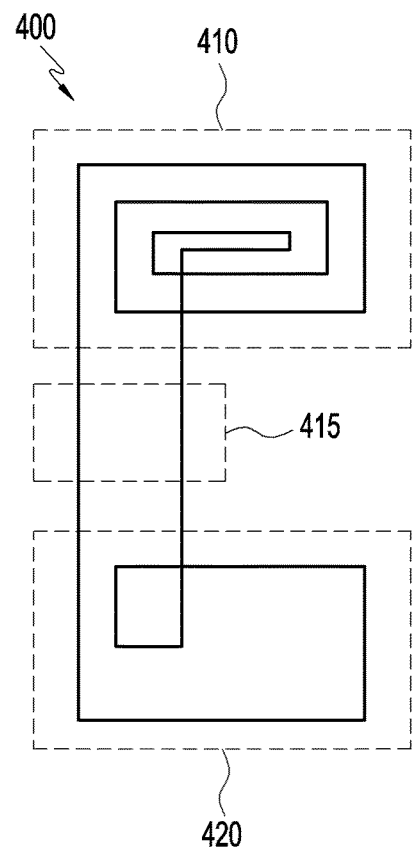
FIGS. 4A to 4C are diagrams illustrating a coil device and an accessory device including the coil device, according to an embodiment.
Figure 4B:
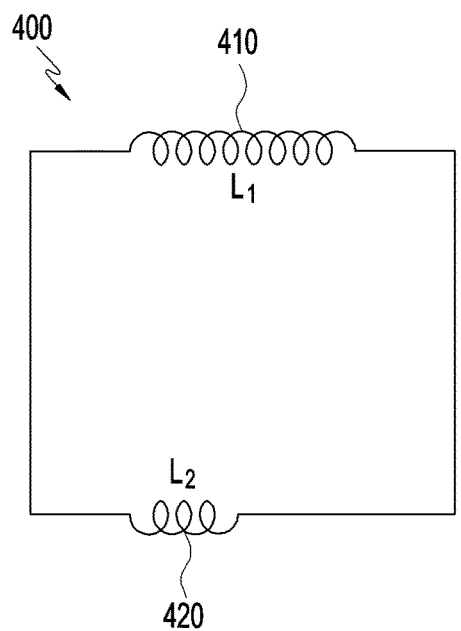
Figure 4C:
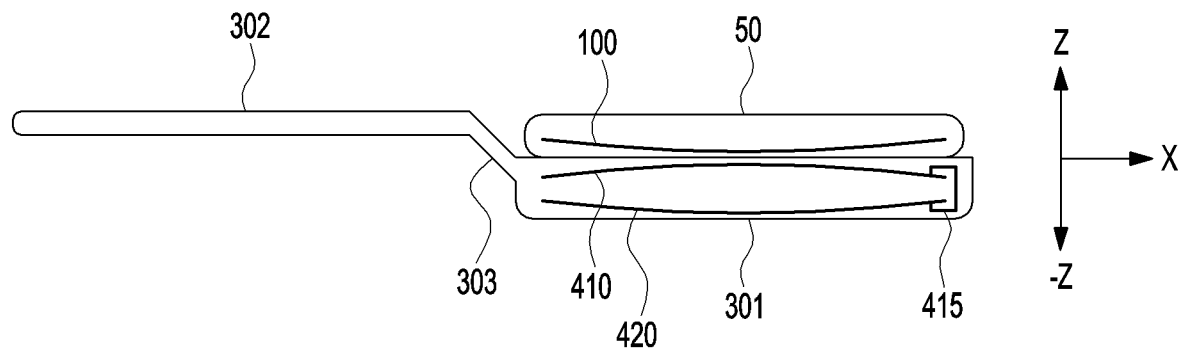

FIGS. 4A to 4C are diagrams illustrating a coil device and an accessory device including the coil device, according to an embodiment.

Referring to FIG. 4A, the coil device 400 includes a first coil 410 and a second coil 420. The first coil 410 and the second coil 420 may be connected to each other by a conductive material 415. Alternatively, the first coil 410 and the second coil 420 may be composed of a single lead wire. The coil device 400 may operate as a passive circuit and may not include its own power source. The coil device 400 may further include at least one switch and a logic circuit capable of controlling the at least one switch. The coil device 400 may change the state of at least one element constituting the coil device 400 using power received from the outside. For example, the coil device 400 may change the state of at least one switch using power received from the outside.

According to an embodiment, at least one of the first coil 410 and the second coil 420 included in the coil device 400 may be a variable coil capable of adjusting an inductance value. The at least one of the first coil 410 and the second coil 420 may include a switch and the inductance value of the at least one of the first coil 410 and the second coil 420 may be changed according to the state of the switch.

FIG. 4B is a circuit diagram of the coil device 400, according to an embodiment. The inductance value of the first coil 410 may be $L_1$ and the inductance value of the second coil 420 may be $L_2$. The first coil 410 and the second coil 420 may be connected to each other by a conductive material or may be composed of a single lead wire.

FIG. 4C is a sectional diagram illustrating an accessory device (e.g., 300 of FIG. 3A) including the coil device 400 and the electronic device 50 coupled to the accessory device. The accessory device may include the first cover 301 that covers at least a portion of the first surface of the electronic device 50 and the second cover 302 that is connected to the first cover 301 via the connection portion 303 and covers at least a portion of the second surface of the electronic device 50.

Referring to FIG. 4C, the first surface of the electronic device 50 is fastened to the first cover 301 of the accessory device. At least one coil 100 capable of transmitting or receiving wireless power may be included inside the electronic device 50. Also, a coil device (e.g., 400 of FIG. 4A) may be included inside the accessory device.

In the coil device included in the accessory device, a first plane including the first coil 410 and a second plane including the second coil 420 may be configured in parallel with each other. For example, at least a portion of the first plane including the first coil 410 and at least a portion of the second plane including the second coil 420 may be configured in parallel with each other. An end of the first coil 410 and an end of the second coil 420 which are parallel to each other may be connected to each other by the conductive material 415. Accordingly, a voltage of the same magnitude may be applied to the first coil 410 and the second coil 420 or a current of the same magnitude may be induced thereto.

Figure 5:
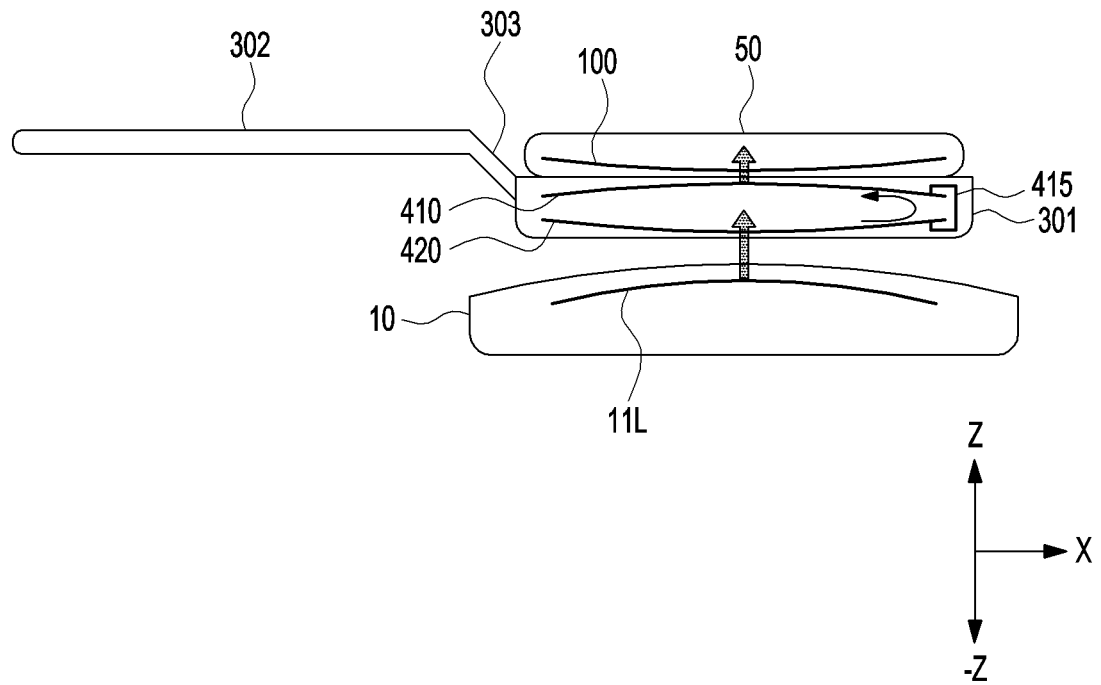
FIG. 5 is a diagram illustrating a process in which wireless charging is performed between a wireless PTU and an electronic device through an accessory device, according to an embodiment.

FIG. 5 is a diagram illustrating a process in which wireless charging is performed between a wireless PTU and an electronic device through an accessory device, according to an embodiment.

Referring to FIG. 5, the electronic device 50 is coupled to an accessory device (e.g., 300 of FIG. 3A), and the accessory device includes the first cover 301, the second cover 302, and the connection portion 303.

According to an embodiment, at least one coil 100 capable of transmitting or receiving wireless power may be included inside the electronic device 50. A coil (e.g., 51L of FIG. 1) may be included in the at least one coil 100. Also, the wireless PTU 10 may include a coil (e.g., 11L of FIG. 1) capable of transmitting wireless power. The electronic device 50 may be disposed on the wireless PTU 10 to receive wireless power in the form of electromagnetic waves from the wireless PTU 10.

Meanwhile, a ratio of a voltage $V_2$ input to a secondary coil (e.g., the coil 51L) included in a wireless power receiver (e.g., the electronic device 50) to a voltage $V_1$ output from a primary coil (e.g., the coil 11L) included in a wireless PTU 10 can be regarded as a voltage gain. This may be expressed by Equation (1).

$$\text{Voltage gain} = \frac{V_2}{V_1} \quad (1)$$

In general, the transmission/reception efficiency of wireless power is increased along with an increase in the voltage gain. That is, as the voltage $V_2$ applied to the coil of the wireless power receiver is greater than the voltage $V_1$ applied to the coil of the wireless power transmitter, the efficiency of the wireless power transmitted from the wireless power transmitter to the wireless power receiver may be increased.

The ratio of the voltage $V_2$ input to the second coil 51L included in the wireless power receiver (e.g., the electronic device 50) to the voltage $V_1$ output from the primary coil 11L included in the wireless PTU 10 may be proportional to a square root of a ratio of the inductance of the secondary coil to the inductance of the primary coil. This may be expressed by Equation (2)

$$\frac{V_2}{V_1} \propto k \sqrt{\frac{L_2}{L_1}} \quad (2)$$

Referring to Equation (2), it can be seen that the voltage gain increases as an inductance value $L_2$ of a secondary coil included in a wireless charge receiver is larger than an inductance value $L_1$ of a primary coil included in a wireless charger transmitter. In other words, when an inductance value of a coil included in a device for transmitting wireless power is smaller than an inductance value of a coil included in a device for receiving wireless power, a voltage gain may be obtained so that normal wireless charging may be achieved.

Accordingly, the inductance value of the at least one coil 100 included in the electronic device 50 may be larger than the inductance value of the coil 11L included in the wireless PTU 10.

According to an embodiment, the electronic device 50 may be coupled to the accessory device 300 including the coil device 400. When the accessory device 300 is thick or the accessory device 300 is made of a shielding material, the wireless charging efficiency between the wireless PTU 10 and the electronic device 50 may be reduced. In this case, the coil device 400 included in the accessory device 300 may perform a function of maintaining or increasing the wireless charging efficiency regardless of the thickness or the material of the accessory device 300. To this end, the inductance value of the second coil 420 included in the coil device 400 may be set to be larger than the inductance value of the coil 11L included in the wireless PTU 10. In addition, the inductance value of the first coil 410 included in the coil device 400 may be set to be smaller than the inductance value of the at least one coil 100 included in the electronic device 50.

When a first electromagnetic field is output from the coil 11L included in the wireless PTU 10, the second coil 420 included in the coil device 400 may receive the outputted first electromagnetic field. An induction current may be generated in the second coil 420 in which the first electromagnetic field is received. The induction current generated in the second coil 420 may be transmitted to the first coil 410 via the conductive material 415. A second electromagnetic field may be output from the first coil 410 to which the induction current is transmitted. When the second electromagnetic field is output from the first coil 410, the at least one coil 100 included in the electronic device 50 may receive the second electromagnetic field. An induction current may be generated in the at least one coil 100 in which the second electromagnetic field is received, and the electronic device 50 may charge a battery (e.g., the battery 51e of FIG. 1) using the generated induction current.

For example, the inductance value of the coil 11L included in the wireless PTU 10 may be 6.3 microhenry (µH). Also, the inductance value of the at least one coil 100 included in the electronic device 50 may be 8.7 µH. Additionally, the inductance value of the first coil 410 included in the coil device 400 may be 6.3 µH and the inductance value of the second coil 420 may be 8.7 µH. Referring to [Equation 2], it can be seen that wireless power is transmitted from a coil having a low inductance value to a coil having a high inductance value. Accordingly, the wireless power output from the coil 11L having an inductance value of 6.3 µH may be transmitted to the second coil 420 having an inductance value of 8.7 µH. The first coil 410 and the second coil 420 may be connected to each other by the conductive material 415 so that the induction current generated in the second coil 420 may be transmitted to the first coil 410. In addition, on the basis of the transmitted induction current, wireless power may be output from the first coil 410. As a result, the wireless power output from the first coil 410 having the inductance value of 6.3 µH may be transmitted to the at least one coil 100 having the inductance value of 8.7 µH.

Figure 6A:
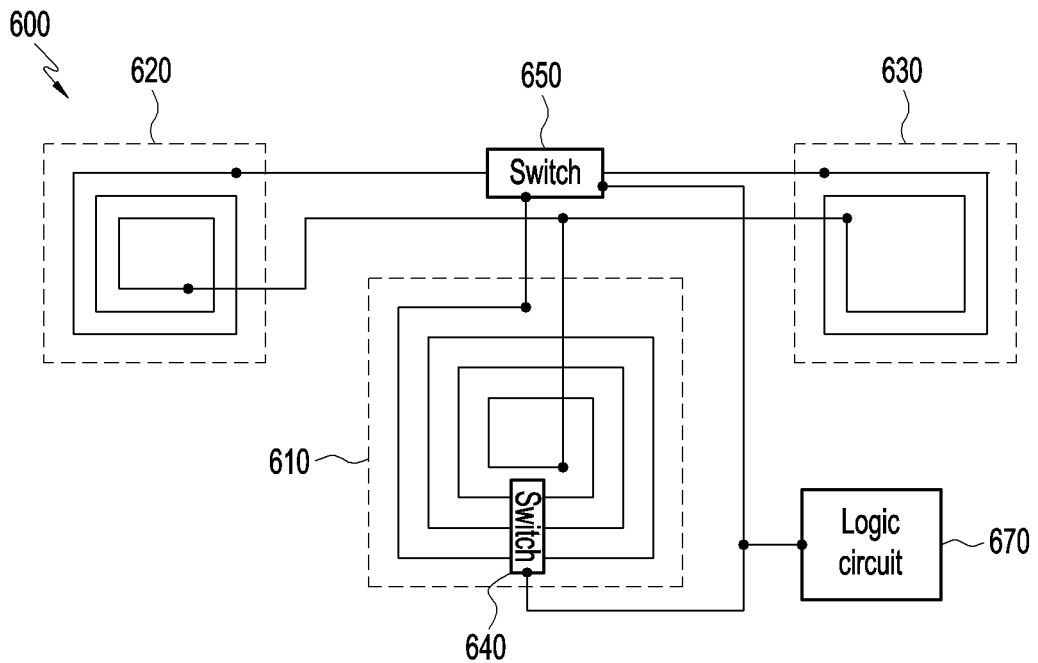
FIGS. 6A to 6C are diagrams illustrating a coil device and an accessory device including the coil device, according to an embodiment.
Figure 6B:
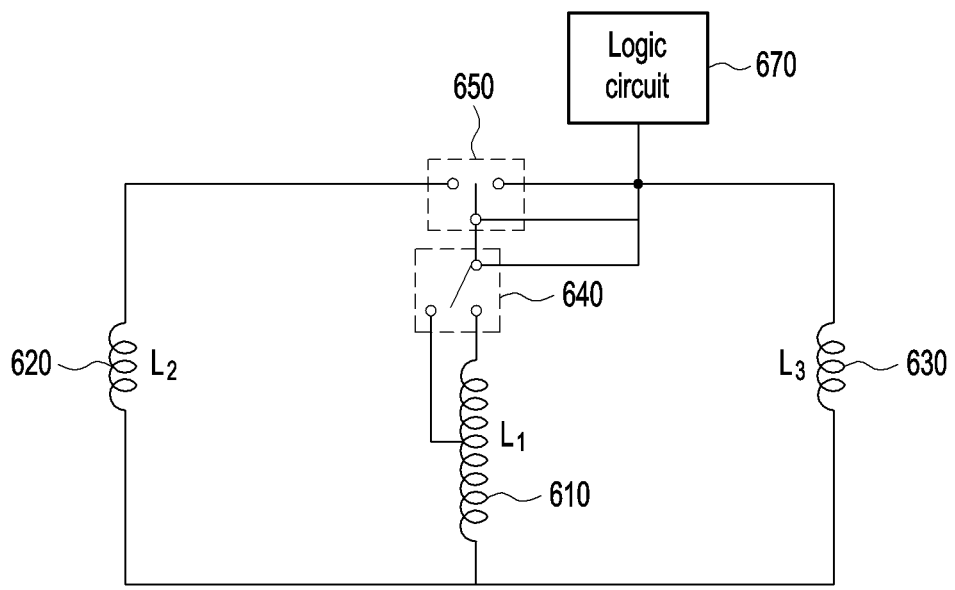
Figure 6C:
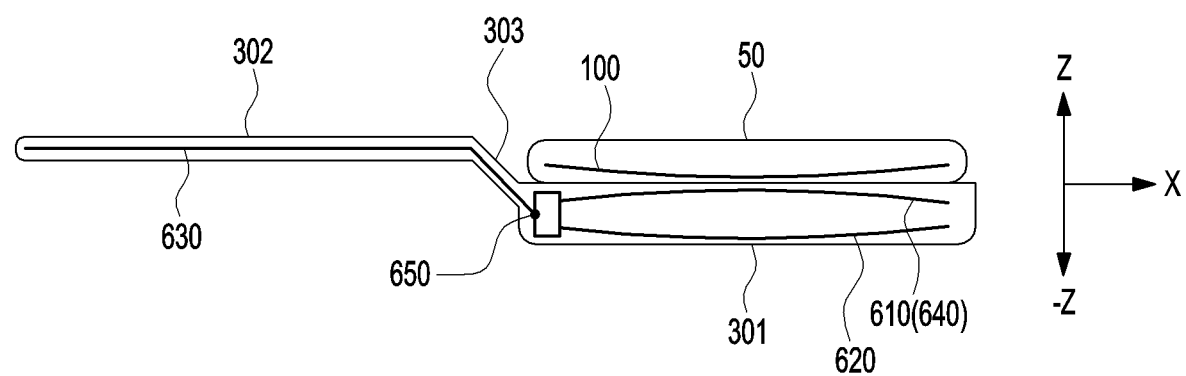

FIGS. 6A to 6C are diagrams illustrating a coil device and an accessory device including the coil device, according to an embodiment.

Referring to FIG. 6A, the coil device 600 includes a first coil 610, a second coil 620, and a third coil 630. The first coil 610, the second coil 620, and the third coil 630 may be connected to each other by a conductive material. Alternatively, the first coil 610, the second coil 620, and the third coil 630 may be composed of a single lead wire. The coil device 600 may operate as a passive circuit and may not include its own power source.

According to an embodiment, the coil device 600 may include a switch 640 inside the first coil 610. The switch 640 may be used to change the inductance value of the first coil 610. The coil device 600 may include a switch 650 capable of changing the connection state between the first coil 610, the second coil 620, and the third coil 630. Further, the coil device 600 may further include a logic circuit 670 capable of controlling at least one switch included in the coil device 600. The coil device 600 may change the state of at least one element constituting the coil device 600, using a signal or power received from the outside. For example, the coil device 600 may change the state of the at least one switch, using a signal or power received from the outside.

According to an embodiment, at least one of the first coil 610, the second coil 620, and the third coil 630 included in the coil device 600 may be a variable coil capable of adjusting an inductance value. A switch may be included in the at least one of the first coil 610, the second coil 620, and the third coil 630, and the inductance value of the at least one of the first coil 610, the second coil 620, and the third coil 630 may be changed.

FIG. 6B is a circuit diagram illustrating the coil device 600, according to an embodiment. The inductance value of the first coil 610 is $L_1$, the inductance value of the second coil 620 is $L_2$, and the inductance value of the third coil 630 is $L_3$.

The inductance value of the first coil 610 may be determined according to the state of the switch 640. For example, the inductance value of the first coil 610 may have a value of either 6.3 µH or 11.5 µH depending on the state of the switch 640. However, this is only an exemplary numerical value, and is not intended to limit the configuration of the present disclosure. Also, the first coil 610 and the second coil 620 may be connected or may not be connected to each other depending on the state of the switch 650. Similarly, the first coil 610 and the third coil 630 may be connected or may not be connected to each other depending on the state of the switch 650. For example, the first coil 610 may be connected to either the second coil 620 or the third coil 630 depending on the state of the switch 650.

FIG. 6C is a sectional diagram illustrating an accessory device (e.g., 300 of FIG. 3A) including the coil device 600 and the electronic device 50 coupled to the accessory device, according to an embodiment. The accessory device may include the first cover 301 that covers at least a portion of a first surface of the electronic device 50 and a second cover 302 that is connected to the first cover 301 through the connection portion 303 and covers at least a portion of a second surface of the electronic device 50.

Referring to FIG. 6C, the first surface of the electronic device 50 is fastened to the first cover 301 of the accessory device. At least one coil 100 capable of transmitting and receiving wireless power may be included inside the electronic device 50. In addition, the coil device 600 may be included inside the accessory device.

According to an embodiment, the coil device 600 included in the accessory device may be configured such that a first plane including the first coil 610 and a second plane including the second coil 620 are parallel to each other. In addition, an end of the first coil 610 and an end of the second coil 620, which are parallel to each other, may be connected to the switch 650. In addition, the third coil 630 may be included inside the second cover 302 of the accessory device. An end of the third coil 630 may be connected to the switch 650 to which the end of the first coil 610 and the end of the second coil 620 are connected, through the inside of the connection portion 303 of the accessory device. The first coil 610 may further include a switch (e.g., 640 of FIG. 6A) capable of adjusting the inductance value of the first coil 610.

According to an embodiment, the coil device 600 may change the state of at least one switch included in the coil device 600, based on at least one signal received from the electronic device 50. The at least one signal received from the electronic device 50 may refer to at least one signal generated in a communication module (e.g., 1390 of FIG. 13). For example, the at least one signal received from the electronic device 50 may include a signal generated in an NFC module, a signal generated in a Wi-Fi module, or a signal generated in a Bluetooth™ module.

When a first signal is received from the electronic device 50, the coil device 600 may be set to a first mode. The first mode may refer to a mode in which the state of the at least one switch included in the coil device 600 is changed based on the first signal received from the electronic device 50. For example, in the first mode, the coil device 600 may control the switch 640 included in the first coil 610 so that the inductance value of the first coil 610 is a first inductance. In addition, in the first mode, the coil device 600 may control the switch 650 so that the first coil 610 and the second coil 620 are connected to each other and the first coil 610 and the third coil 630 are not connected to each other.

When a second signal is received from the electronic device 50, the coil device 600 may be set to a second mode. The second mode may refer to a mode in which the state of the at least one switch included in the coil device 600 is changed to be different from the first mode based on the second signal received from the electronic device 50. For example, in the second mode, the coil device 600 may control the switch 640 included in the first coil 610 so that the inductance value of the first coil 610 is to be a second inductance. In addition, in the second mode, the coil device 600 may control the switch 650 so that the first coil 610 and the third coil 630 are connected to each other and the first coil 610 and the second coil 620 are not connected to each other.

Additionally, those skilled in the art will readily understand that numerical values presented are exemplary and can be variously set.

Figure 7A:
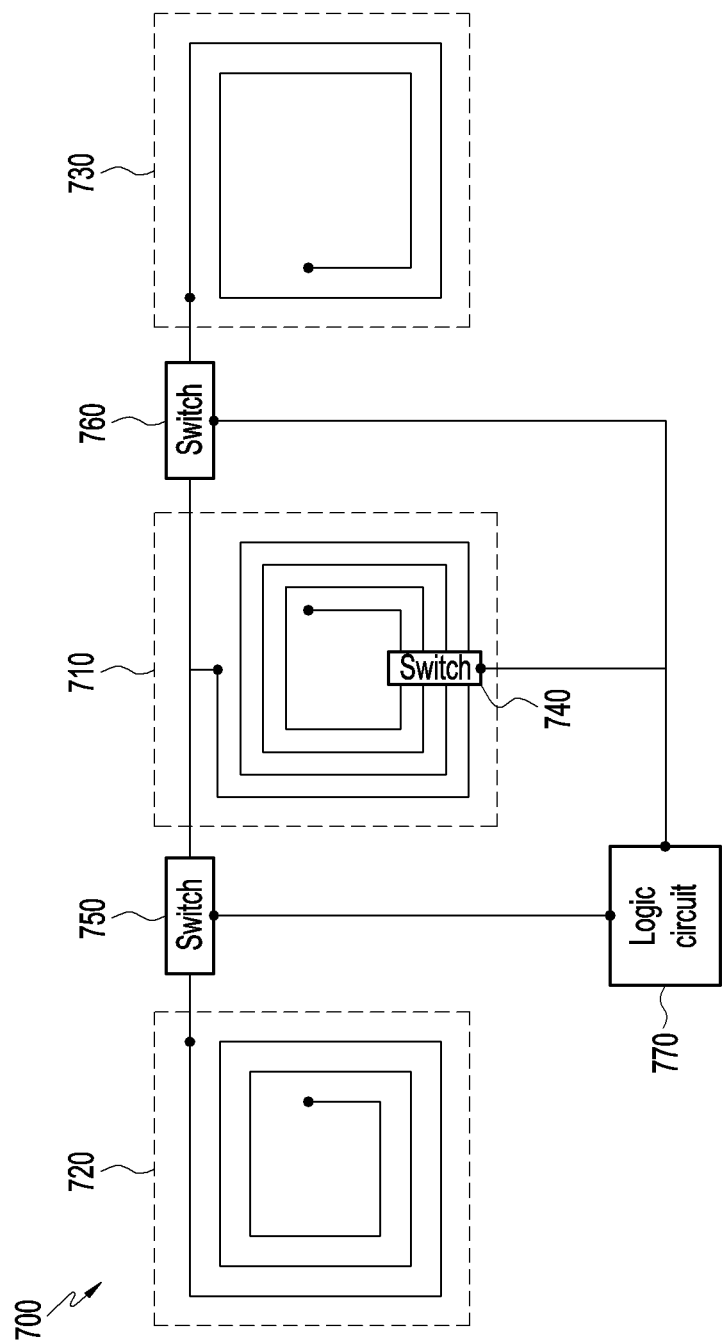
FIGS. 7A to 7C are diagrams illustrating a coil device and an accessory device including the coil device, according to an embodiment.
Figure 7B:
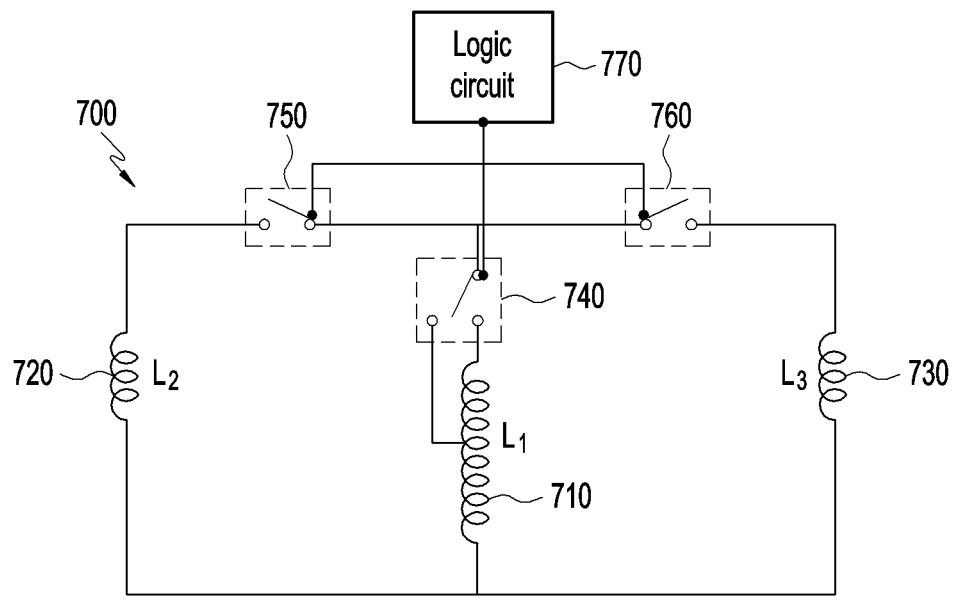
Figure 7C:
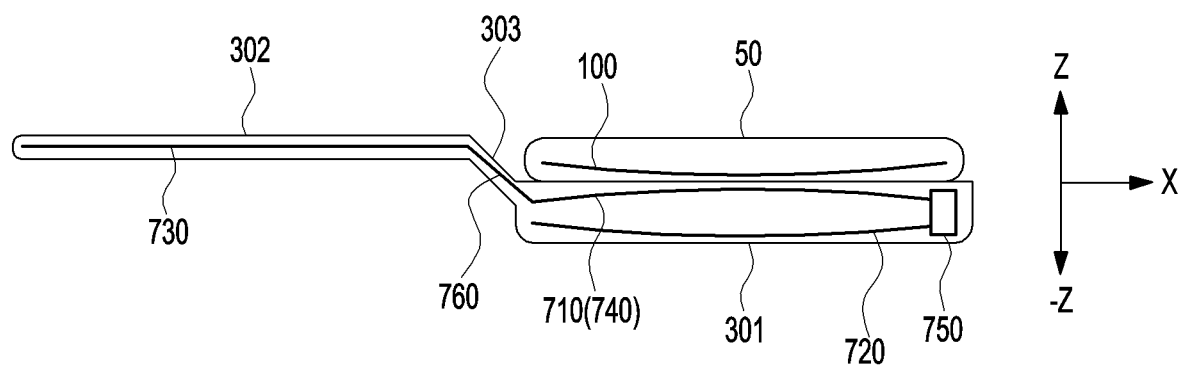

FIGS. 7A to 7C are diagrams illustrating a coil device and an accessory device including the coil device, according to an embodiment.

Referring to FIG. 7A, the coil device 700 includes a first coil 710, a second coil 720, and a third coil 730. The first coil 710, the second coil 720, and the third coil 730 may be connected to each other by a conductive material. Alternatively, the first coil 710, the second coil 720, and the third coil 730 may be composed of a single lead wire. The coil device 700 may operate as a passive circuit and may not include its own power source.

According to an embodiment, the coil device 700 may include a switch 740 inside the first coil 710. The switch 740 may be used to change an inductance value of the first coil 710. The coil device 700 may include a switch 750 capable of changing the connection state of the first coil 710 and the second coil 720. The coil device 700 may include a switch 760 capable of changing the connection state of the first coil 710 and the third coil 730. In addition, the coil device 700 may further include a logic circuit 770 capable of controlling the at least one switch included in the coil device 700. The coil device 700 may change the state of at least one element constituting the coil device 700, using a signal or power received from the outside. For example, the coil device 700 may change the state of the at least one switch, using a signal or power received from the outside.

According to an embodiment, at least one of the first coil 710, the second coil 720, and the third coil 730 included in the coil device 700 may be a variable coil capable of adjusting an inductance value. A switch may be included in the at least one of the first coil 710, the second coil 720, and the third coil 730, and the inductance value of the at least one of the first coil 710, the second coil 720, and the third coil 730 may be changed.

FIG. 7B is a circuit diagram illustrating the coil device 700, according to an embodiment. The inductance value of the first coil 710 is $L_1$, the inductance value of the second coil 720 is $L_2$, and the inductance value of the third coil 730 is $L_3$.

According to an embodiment, the inductance value of the first coil 710 may be determined according to the state of the switch 740. For example, the inductance value of the first coil 710 may have a value of either 6.3 µH or 11.5 µH depending on the state of the switch 740. However, this is only an exemplary numerical value, and is not intended to limit the configuration of the present disclosure. In addition, the first coil 710 and the second coil 720 may be connected or may not be connected to each other according to the state of the switch 750. In addition, the first coil 710 and the third coil 730 may be connected or may not be connected to each other according to the state of the switch 760.

FIG. 7C is a sectional diagram illustrating an accessory device (e.g., 300 of FIG. 3A) including the coil device 700 and the electronic device 50 coupled to the accessory device, according to an embodiment. The accessory device may include the first cover 301 that covers at least a portion of a first surface of the electronic device 50 and a second cover 302 that is connected to the first cover 301 through the connection portion 303 and covers at least a portion of a second surface of the electronic device 50.

Referring to FIG. 7C, the first surface of the electronic device 50 is fastened to the first cover 301 of the accessory device. At least one coil 100 capable of transmitting and receiving wireless power may be included inside the electronic device 50. In addition, the coil device 700 may be included inside the accessory device.

According to an embodiment, the coil device 700 included in the accessory device may be configured such that a first plane including the first coil 710 and a second plane including the second coil 720 are parallel to each other. In addition, an end of the first coil 710 and an end of the second coil 720, which are parallel to each other, may be connected to the switch 750. In addition, the third coil 730 may be included inside the second cover 302 of the accessory device. An end of the third coil 730 and the other end of the first coil 710 may be connected to the switch 760 through the inside of the connection portion 303 of the accessory device. The other end of the first coil 710 may refer to a portion positioned opposite the end of the first coil 710 connected to the end of the second coil 720. The first coil 710 may further include the switch 740 capable of adjusting the inductance value of the first coil 710.

According to an embodiment, the coil device 700 may change the state of at least one switch included in the coil device 700, based on at least one signal received from the electronic device 50. The at least one signal received from the electronic device 50 may include an NFC signal.

When a first signal is received from the electronic device 50, the coil device 700 may be set to a first mode. The first mode may refer to a mode in which the state of the at least one switch included in the coil device 700 is changed based on the first signal received from the electronic device 50. For example, in the first mode, the coil device 700 may control the switch 740 included in the first coil 710 so that the inductance value of the first coil 710 is a first inductance. In addition, in the first mode, the coil device 700 may control the switch 750 so that the first coil 710 and the second coil 720 are connected to each other. Additionally, in the first mode, the coil device 700 may control the switch 760 so that the first coil 710 and the third coil 730 are not connected to each other.

When a second signal is received from the electronic device 50, the coil device 700 may be set to a second mode. The second mode may refer to a mode in which the state of the at least one switch included in the coil device 700 is changed to be different from the first mode based on the second signal received from the electronic device 50. For example, in the second mode, the coil device 700 may control the switch 740 included in the first coil 710 so that the inductance value of the first coil 710 is a second inductance. In addition, in the second mode, the coil device 700 may control the switch 760 so that the first coil 710 and the third coil 730 are connected to each other. Additionally, in the second mode, the coil device 700 may control the switch 750 so that the first coil 710 and the second coil 720 are not connected to each other.

Figure 8:
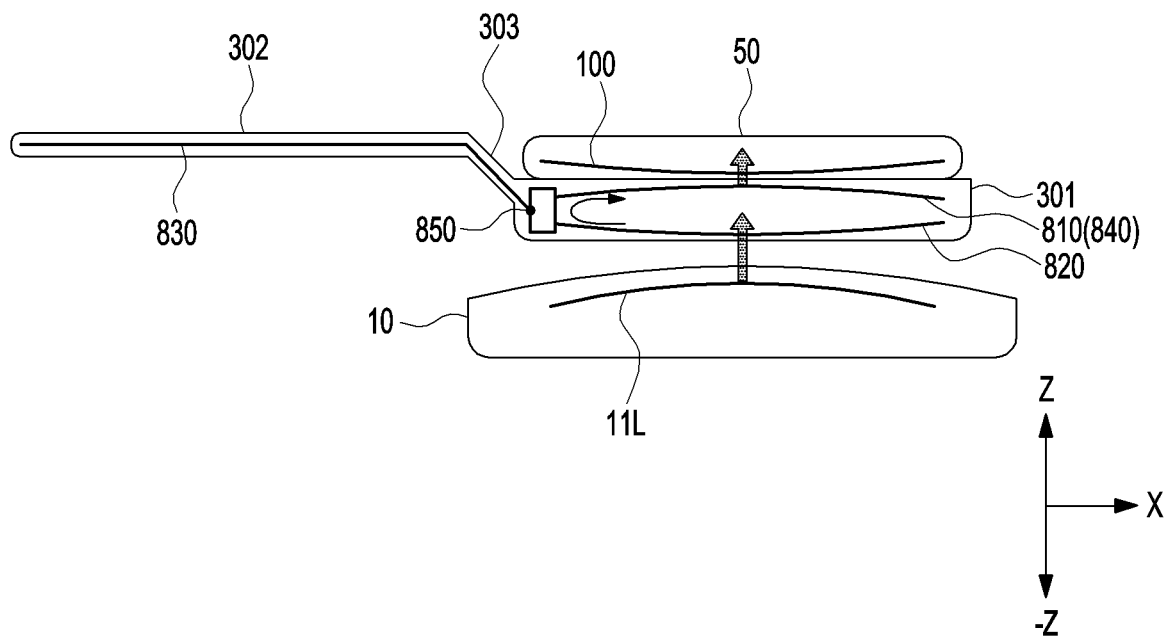
FIG. 8 is a diagram illustrating a process in which wireless charging is performed between a wireless PTU and an electronic device through an accessory device, according to an embodiment.
Figure 9:
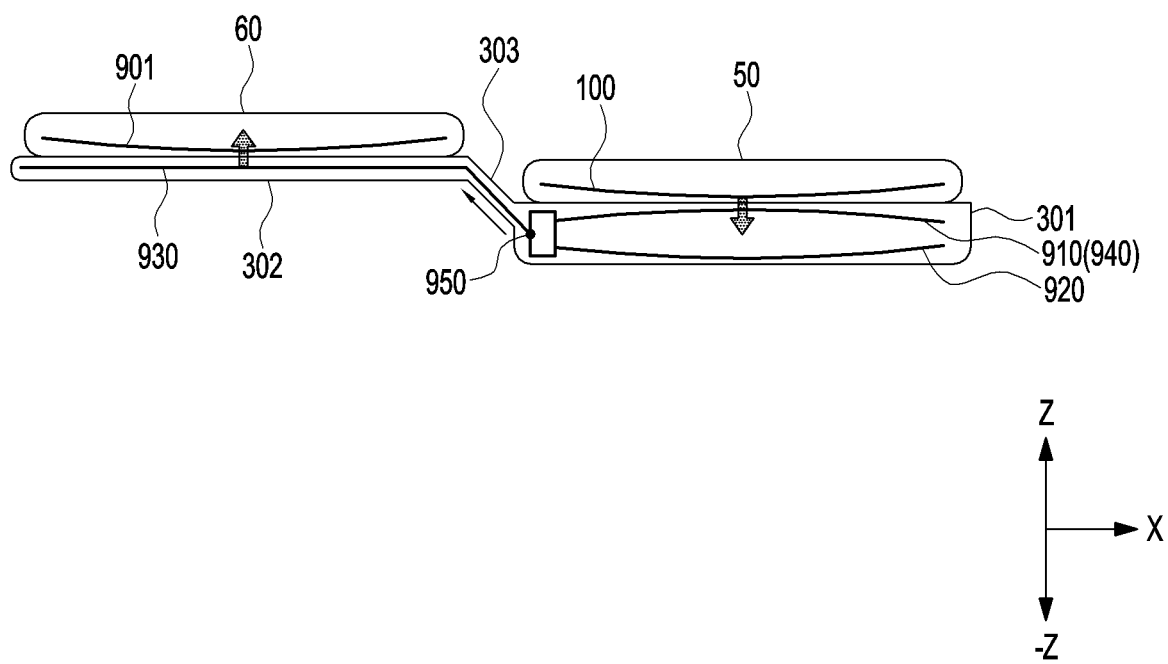
FIG. 9 is a diagram illustrating a process in which wireless charging is performed between electronic devices through an accessory device, according to an embodiment.

FIGS. 8 and 9 are diagrams illustrating a process in which wireless charging is performed through an accessory device, according to an embodiment.

Referring to FIGS. 8 and 9, sectional diagrams illustrating an accessory device (e.g., 300 of FIG. 3A) including a coil device (e.g., 600 of FIG. 6A) and the electronic device 50 coupled to the accessory device are provided. In addition, FIGS. 8 and 9 are sectional diagrams of the wireless PTU 10 capable of supplying wireless power to the electronic device 50.

The coil device may change the state of at least one switch included in the coil device based on at least one signal received from the electronic device 50. For example, when a first signal is received from the electronic device 50, the coil device may be set to a first mode. Conversely, when a second signal is received from the electronic device 50, the coil device may be set to a second mode.

FIG. 8 is a diagram illustrating a process in which wireless charging is performed between a wireless PTU and an electronic device through an accessory device in a first mode, according to an embodiment.

For example, the inductance value of at least one coil 100 included in the electronic device 50 may be 8.7 µH. The inductance value of the coil 11L included in the wireless PTU 10 may be 6.3 µH. The inductance value of a first coil 810 included in the coil device (e.g., 600 of FIG. 6A) may be 6.3 µH or 11.5 µH depending on the state of a switch 840. In addition, the inductance value of a second coil 820 included in the coil device may be 8.7 µH. Additionally, the inductance value of a third coil 830 included in the coil device (e.g., 600 of FIG. 6A) may be 6.3 µH.

When a first signal is received from the electronic device 50, the coil device may be set to a first mode. In the first mode, the coil device may control the switch 840 included in the first coil 810 so that the inductance value of the first coil 810 is a first inductance. Here, the first inductance may be 6.3 µH. In addition, in the first mode, the coil device may control the switch 850 so that the first coil 810 and the second coil 820 are connected to each other and the first coil 810 and the third coil 830 are not connected to each other.

Referring to Equation (2), it can be seen that wireless power is transmitted from a coil having a low inductance value to a coil having a high inductance value. When a first electromagnetic field is output from the coil 11L included in the wireless PTU 10, the second coil 820 of the coil device 600 may receive the first electromagnetic field. An induction current may be generated in the second coil 820 having received the first electromagnetic field. The induction current generated in the second coil 820 may be transmitted to the first coil 810 connected through the switch 850. A second electromagnetic field may be output from the first coil 810 to which the induction current is transmitted. When the second electromagnetic field is output from the first coil 810, at least one coil 100 included in the electronic device 50 may receive the second electromagnetic field. An induction current may be generated in the at least one coil 100 in which the second electromagnetic field is received, and the electronic device 50 may charge a battery (e.g., the battery 51e of FIG. 1) using the generated induction current.

FIG. 9 is a diagram illustrating a process in which wireless charging is performed between electronic devices through an accessory device in a second mode, according to an embodiment.

For example, the inductance value of at least one coil 100 included in an electronic device 50 may be 8.7 µH. In addition, the inductance value of at least one coil 901 included in an electronic device 60 may be 8.7 µH. The inductance value of the first coil 910 included in the coil device (e.g., 600 of FIG. 6A) may be 6.3 µH or 11.5 µH depending on the state of the switch 940. In addition, the inductance value of a second coil 920 included in the coil device 600 may be 8.7 µH. Additionally, the inductance value of a third coil 930 included in the coil device 600 may be 6.3 µH.

When a second signal is received from the electronic device 50, the coil device may be set to a second mode. In the second mode, the coil device may control the switch 940 included in the first coil 910 so that the inductance value of the first coil 910 is a second inductance. Here, the second inductance may be 11.5 µH. In addition, in the second mode, the coil device may control the switch 950 so that the first coil 910 and the third coil 930 are connected to each other and the first coil 910 and the second coil 920 are not connected to each other.

Referring to Equation (2), it can be seen that wireless power is transmitted from a coil having a low inductance value to a coil having a high inductance value. When a first electromagnetic field is output from the at least one coil 100 included in the electronic device 50, the first coil 910 of the coil device may receive the first electromagnetic field. An induction current may be generated in the first coil 910 having received the first electromagnetic field. The induction current generated in the first coil 910 may be transmitted to the third coil 930 connected through the switch 950. A second electromagnetic field may be output from the third coil 930 to which the induction current is transmitted. When the second electromagnetic field is output from the third coil 930, the at least one coil 910 included in the electronic device 60 may receive the second electromagnetic field. An induction current may be generated in the at least one coil 910 in which the second electromagnetic field is received, and the electronic device 60 may charge a battery included in the electronic device 60, using the generated induction current.

According to an embodiment, the accessory device (e.g., 300 of FIG. 3A) may include a coil device (e.g., 700 of FIG. 7A). When a first signal is received from the electronic device 50, the coil device may be set to a first mode. In the first mode, the coil device may control the switch 740 included in the first coil 710 so that the inductance value of the first coil 710 is a first inductance. In addition, in the first mode, the coil device may control the switch 750 so that the first coil 710 and the second coil 720 are connected to each other. Additionally, in the first mode, the coil device may control the switch 760 so that the first coil 710 and the third coil 730 are not connected to each other.

Alternatively, when a second signal is received from the electronic device 50, the coil device may be set to a second mode. In the second mode, the coil device may control the switch 740 included in the first coil 710 so that the inductance value of the first coil 710 is a second inductance. In addition, in the second mode, the coil device may control the switch 760 so that the first coil 710 and the third coil 730 are connected to each other. Additionally, in the second mode, the coil device may control the switch 750 so that the first coil 710 and the second coil 720 are not connected to each other.

As shown in FIGS. 8 and 9, the accessory device can be used in two modes by controlling the switches 850 and 950 and the switches 840 and 940 included in the first coils 810 and 910, but the present disclosure is not limited thereto. A switch may be further included in at least one of the second coils 820 and 920 and the third coils 830 and 930, and the accessory device may be used differently from the first mode or the second mode by controlling the switch included in the at least one of the second coils 820 and 920 and the third coils 830 and 930. For example, when the switch is further included in the third coils 830 and 930, the coil device (e.g., 600 of FIG. 6A) may charge the battery of the electronic device 50 using the wireless power output from the electronic device 60 by controlling the switches 850 and 950 and the switch included in the third coils 830 and 930.

Figure 10:
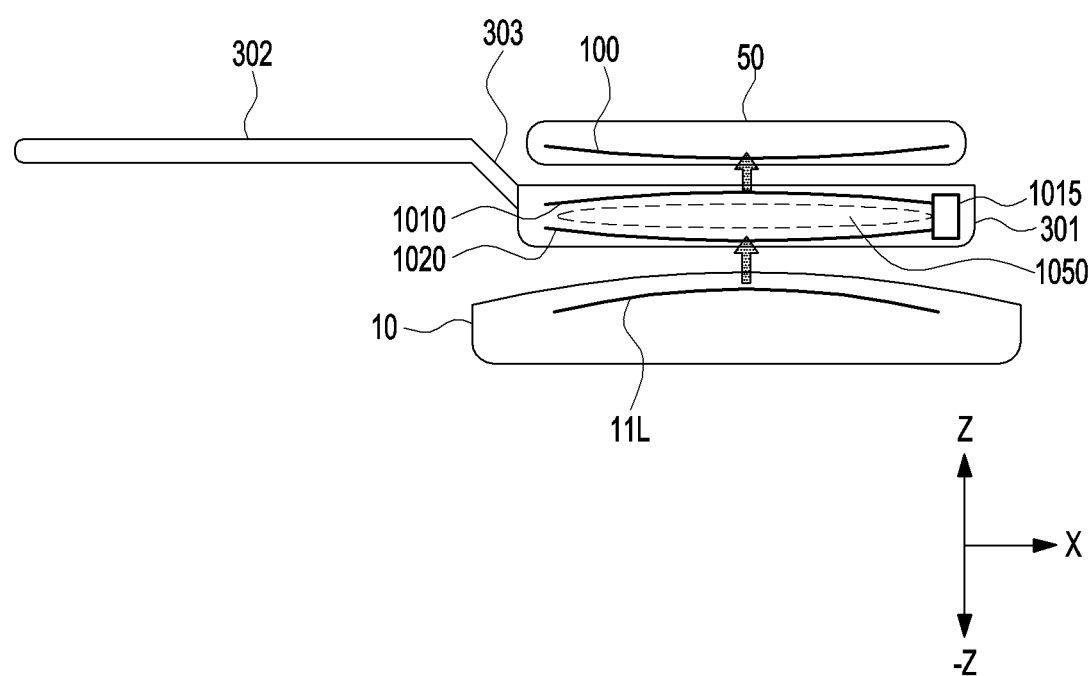
FIG. 10 is a diagram illustrating the structure of an accessory device including a separate accommodating space, according to an embodiment.

FIG. 10 is a diagram illustrating the structure of an accessory device including a separate accommodating space, according to an embodiment. The electronic device 50 may be coupled to an accessory device (e.g., 300 of FIG. 3A), and the accessory device may include the first cover 301, the second cover 302, and the connection portion 303.

Referring to FIG. 10, a coil device included in the accessory device may be configured such that a first plane including a first coil 1010 and a second plane including a second coil 1020 are parallel to each other. In addition, an end of the first coil 1010 and an end of the second coil 1020, which are parallel to each other, may be connected to each other by a conductive material 1015. Accordingly, a voltage of the same magnitude may be applied to the first coil 1010 and the second coil 1020 or a current of the same magnitude may be similarly applied.

An electromagnetic field output from the coil 11L included in the wireless PTU 10 may be transmitted to the coil 100 included in the electronic device 50. When an object having a magnetic strip (i.e., a credit card) is placed between the coil 11L included in the wireless PTU 10 and the coil 100 included in the electronic device 50, the magnetic strip may be damaged by an electromagnetic field generated in a wireless charging process.

The accessory device may be configured to include an accommodating space 1050 into which the object having a magnetic strip can be inserted within the first cover 301. For example, in order to charge the battery of the electronic device 50 coupled to the accessory device in a wireless charging scheme, the electronic device 50 may be placed on the wireless PTU 10. In this case, a first electromagnetic field output from the coil 11L included in the wireless PTU 10 may be transmitted to the second coil 1020 included in the accessory device. An induction current may be generated in the second coil 1020 to which the first electromagnetic field is transmitted, and the generated induction current may be transmitted to the first coil 1010 through the conductive material 1015. In this manner, the first electromagnetic field and the induction current do not affect the accommodating space 1050, and thereby the magnetic strip of the object inserted into the accommodating space 1050 may be protected.

Figure 11:
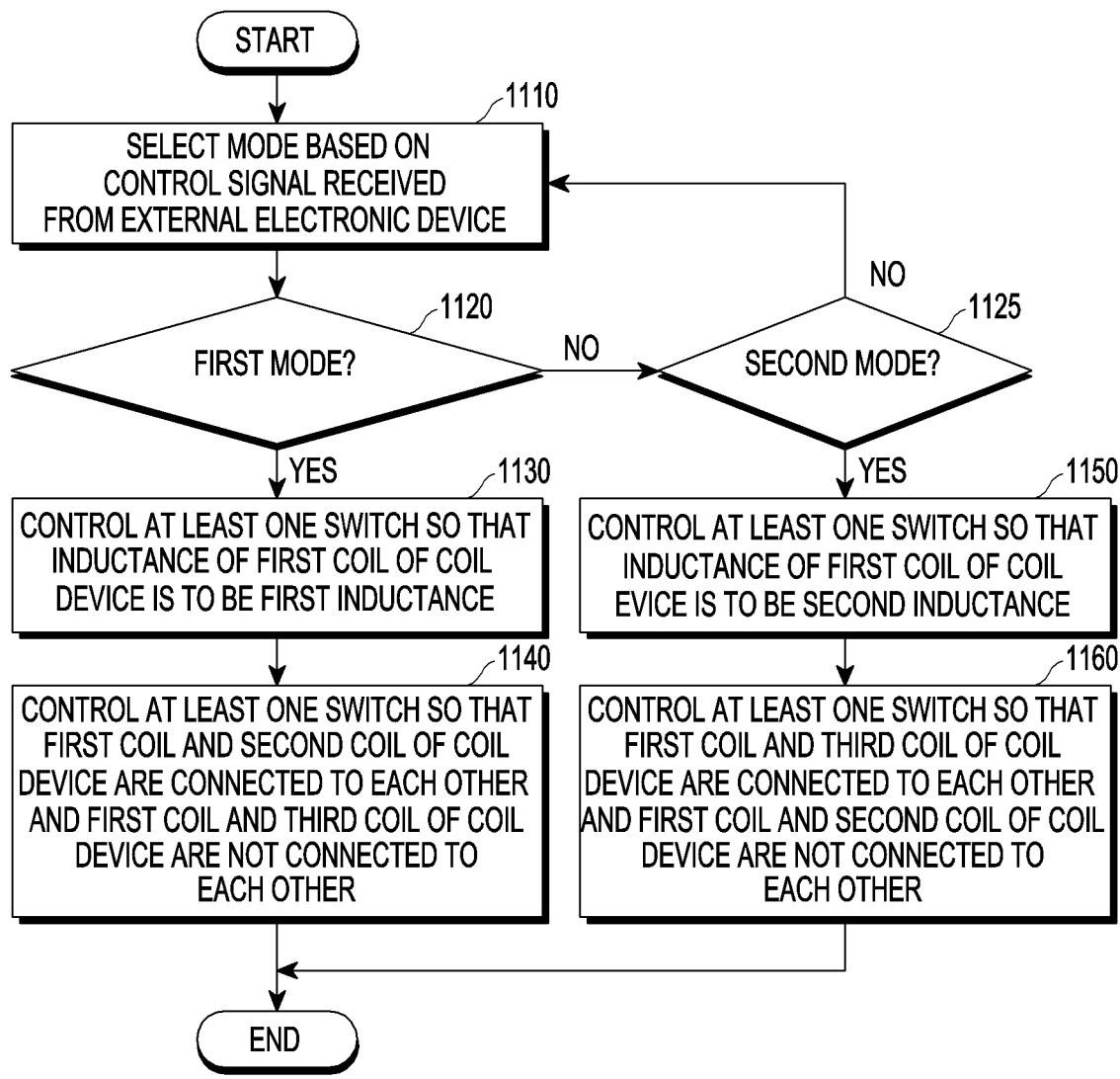
FIG. 11 is a flowchart illustrating a method in which wireless charging is performed through an accessory device, according to an embodiment.

FIG. 11 is a flowchart illustrating a method in which wireless charging is performed through an accessory device, according to an embodiment.

In a coil device (e.g., 600 of FIG. 6A) including at least one coil (e.g., 610, 620, and 630 of FIG. 6A), at least one switch (e.g., 640 and 650 of FIG. 6A), and a logic circuit (e.g., 670 of FIG. 6A), the logic circuit may perform the method.

In step 1110, the coil device selects the mode of the coil device based on a control signal received from an external electronic device. For example, when a first signal is received from the electronic device 50, the coil device 600 may be set to a first mode. Additionally, when a second signal is received from the electronic device 50, the coil device 600 may be set to a second mode.

In step 1120, the coil device determines whether the mode of the coil device should be set to the first mode based on the control signal received from the external electronic device. When it is determined that the mode should be set to the first mode, the coil device performs steps 1130 and 1140. Conversely, when it is not determined that the mode should be set to the first mode, the coil device performs step 1125.

In step 1125, the coil device determines whether the mode of the coil device should be set to the second mode based on the control signal received from the external electronic device. When it is determined that the mode should be set to the second mode, the coil device performs steps 1150 and 1160. Conversely, when it is not determined that the mode should be set to the second mode, the coil device performs step 1110 again to determine whether the control signal received from the external electronic device is a control signal associated with the first mode and the second mode.

In step 1130, the coil device controls at least one switch so that the inductance value of the first coil of the coil device is a first inductance. For example, the coil device 600 may control the switch 640 included in the first coil 610 so that the inductance value of the first coil 610 is a first inductance.

In step 1140, the coil device controls the at least one switch so that the first coil and the second coil of the coil device are connected to each other and the first coil and the third coil of the coil device are not connected to each other. For example, the coil device 600 may control the switch 650 so that the first coil 610 and the second coil 620 are connected to each other and the first coil 610 and the third coil 630 are not connected to each other. Alternatively, the coil device 700 may control the switch 750 so that the first coil 710 and the second coil 720 are connected to each other, and may control the switch 760 so that the first coil 710 and the third coil 730 are not connected each other.

In step 1150, the coil device controls the at least one switch so that the inductance value of the first coil of the coil device is a second inductance. For example, the coil device 600 may control the switch 640 included in the first coil 610 so that the inductance value of the first coil 610 is the second inductance.

In step 1160, the coil device controls the at least one switch so that the first coil and the third coil of the coil device are connected to each other and the first coil and the second coil of the coil device are not connected to each other. For example, the coil device 600 may control the switch 650 so that the first coil 610 and the third coil 630 are connected to each other and the first coil 610 and the second coil 620 are not connected to each other. Alternatively, the coil device 700 may control the switch 760 so that the first coil 710 and the third coil 730 are connected to each other, and may control the switch 750 so that the first coil 710 and the second coil 720 are not connected to each other.

Figure 12A:
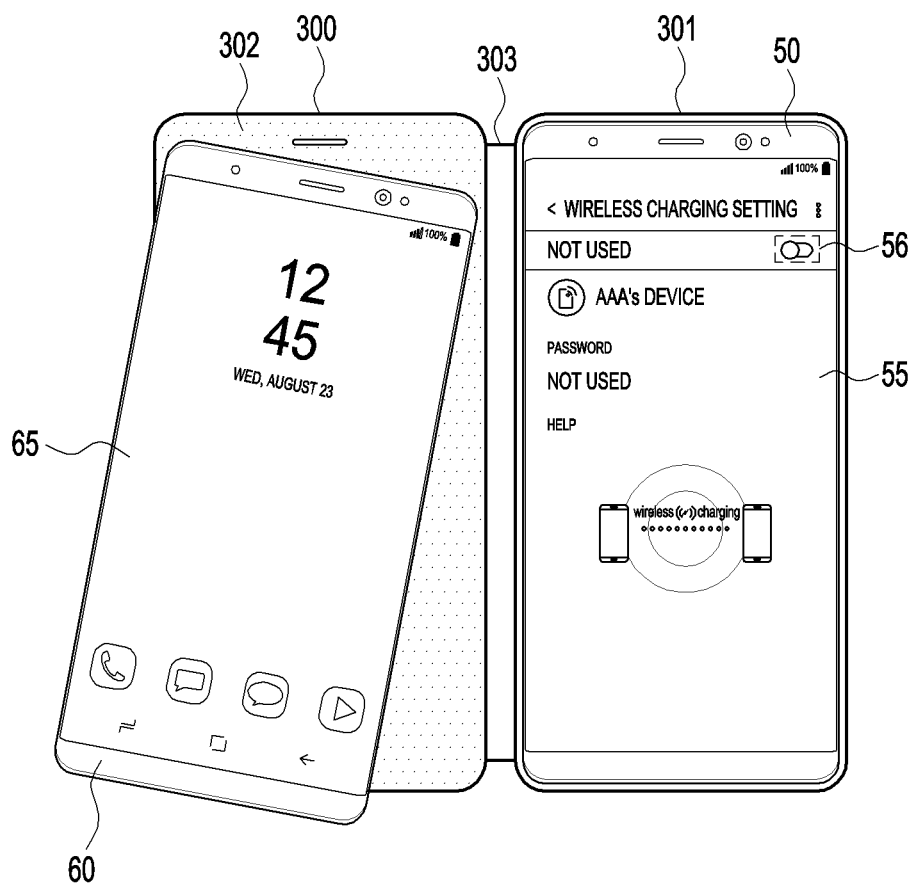
FIGS. 12A and 12B are diagrams illustrating a user interface of an electronic device, according to an embodiment.
Figure 12B:
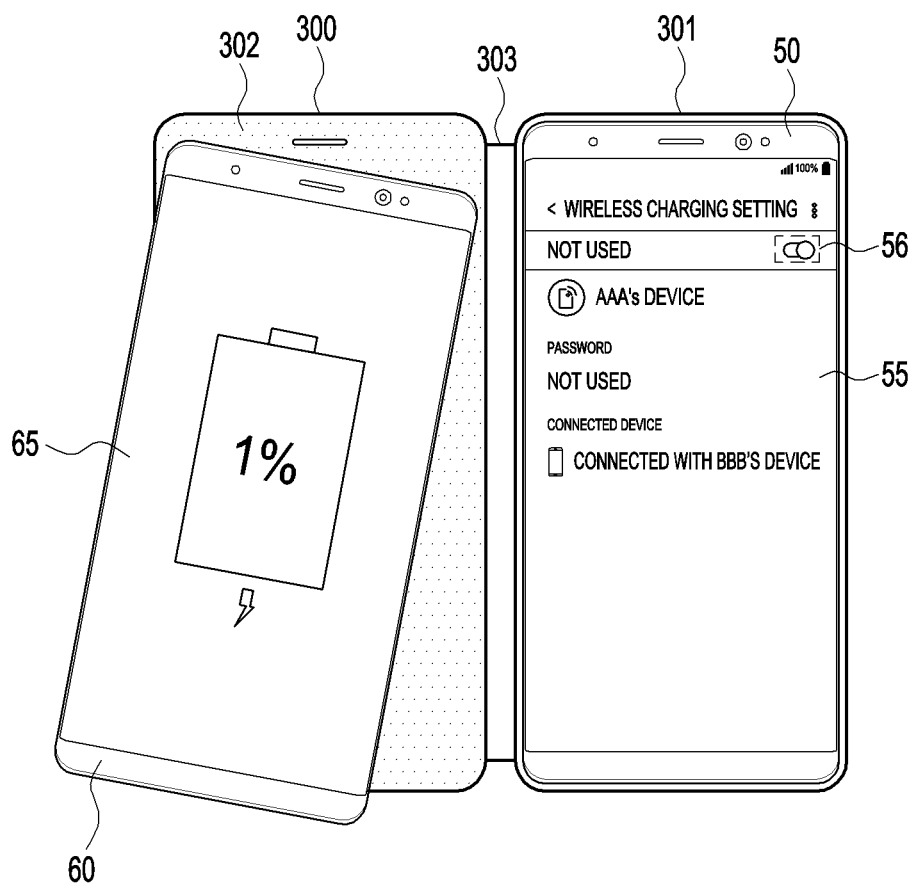

FIGS. 12A and 12B are diagrams illustrating a user interface of an electronic device, according to an embodiment.

Referring to FIG. 12A, the electronic device 50 is coupled to the accessory device 300, and the accessory device 300 includes the first cover 301, the second cover 302, the connection portion 303, and the display 55.

According to an embodiment, a user interface associated with wireless charging may be displayed on the display 55 of the electronic device 50. The user interface may include state information of the electronic device 50 and state information of another electronic device 60 that can be connected to the electronic device 50.

When a button 56 included in the user interface is turned off, as shown in FIG. 12A, the electronic device 50 may receive wireless power from the wireless PTU 10. The electronic device 50 may output a first signal when the button 56 is turned off. The accessory device 300 may receive the first signal output from the electronic device 50. When the first signal is received, the coil device 600 included in the accessory device 300 may be set to a first mode.

In addition, when the button 56 included in the user interface is turned on, as shown in FIG. 12B, the electronic device 50 may transmit wireless power to the electronic device 60. The electronic device 50 may output a second signal when the button 56 is turned on. The accessory device 300 may receive the second signal output from the electronic device 50. When the second signal is received, the coil device 600 included in the accessory device 300 may be set to a second mode. As the coil device included in the accessory device 300 is set to the second mode, an interface associated with charging may be displayed on the display 65 of the electronic device 60.

When an input from the outside is received at the button 56 included in the user interface of the electronic device 50, the button 56 may be turned on/off.

Figure 13:
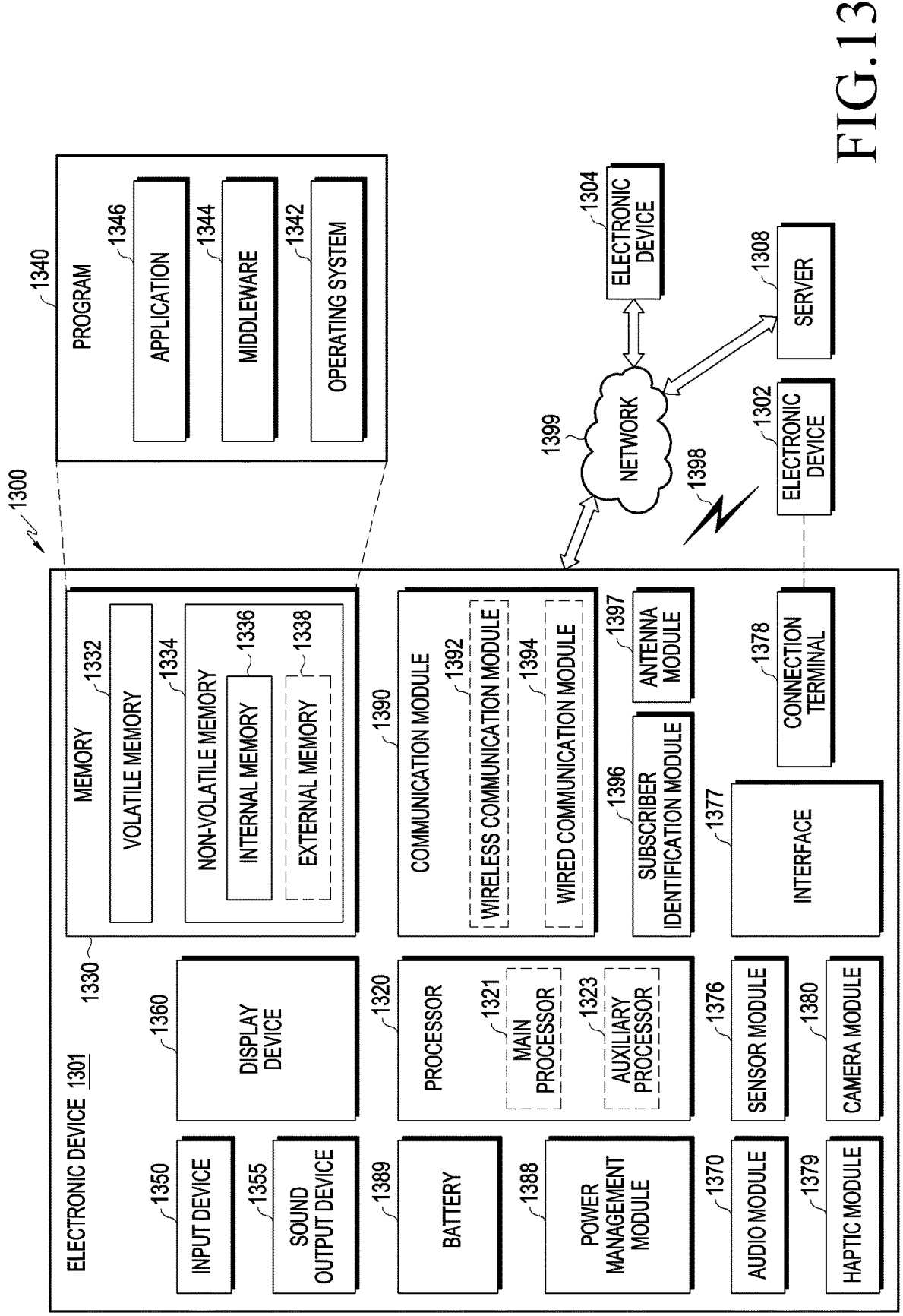
FIG. 13 is a block diagram illustrating an electronic device within a network environment, according to an embodiment.

FIG. 13 is a block diagram illustrating an electronic device 1301 within a network environment 1300 according to an embodiment. Referring to FIG. 13, in the network environment 1300, the electronic device 1301 may communicate with an electronic device 1302 through a first network 1398 (e.g., a short-range wireless communication network) or an electronic device 1304 or a server 1308 via a second network 1399 (e.g., a long-range wireless communication network). The electronic device 1301 may communicate with the electronic device 1304 through the server 1308. The electronic device 1301 may include a processor 1320, a memory 1330, an input device 1350, an audio output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, and an antenna module 1397. In some embodiments, at least one (e.g., the display device 1360 or the camera module 1380) of the components may be omitted or other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a CPU or an AP), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one (e.g., the display device 1360, the sensor module 1376, or the communication module 1390) of the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signaling processor or a communication processor) may be implemented as part of another component (e.g., the camera module 1380 or the communication module 1390) functionally related to the auxiliary processor 1323.

The memory 1330 may store various data by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound and an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, a barometric sensor, a magnetic sensor, an acceleration sensor, a grip sensor, a proximity sensor, a color sensor, an IR sensor, a biosensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or IrDA) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. Another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 14:
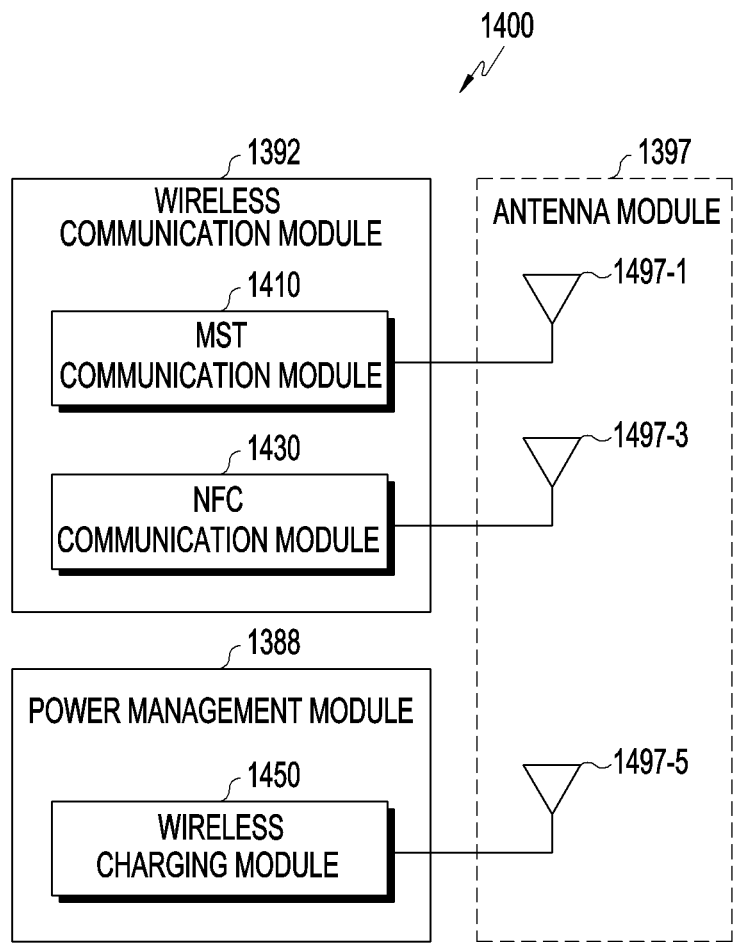
FIG. 14 is a block diagram illustrating a wireless communication module, a power management module, and an antenna module of an electronic device, according to an embodiment.

FIG. 14 is a block diagram 1400 illustrating the wireless communication module 1392, the power management module 1388, and the antenna module 1397 of the electronic device 1301 according to various embodiments. Referring to FIG. 14, the wireless communication module 1392 may include a magnetic secure transmission (MST) communication module 1410 or an NFC communication module 1430, and the power management module 1388 may include a wireless charging module 1450. In such a case, the antenna module 1397 may include a plurality of antennas that include an MST antenna 1497-1 connected with the MST communication module 1410, an NFC antenna 1497-3 connected with the NFC communication module 1430, and a wireless charging antenna 1497-5 connected with the wireless charging module 1450. For ease of description, the same components as those described in regard to FIG. 13 are briefly described or omitted from the description.

The MST communication module 1410 may receive a signal containing control information or payment information such as card information from the processor 1320, generate a magnetic signal corresponding to the received signal, and then transfer the generated magnetic signal to the external electronic device 1302 (e.g., a POS device) via the MST antenna 1497-1. To generate the magnetic signal, according to an embodiment, the MST communication module 1410 may include a switching module that includes one or more switches connected with the MST antenna 1497-1, and control the switching module to change the direction of voltage or current supplied to the MST antenna 1497-1 according to the received signal. The change of the direction of the voltage or current allows the direction of the magnetic signal (e.g., a magnetic field) emitted from the MST antenna 1497-1 to change accordingly. If detected at the external electronic device 1302, the magnetic signal with its direction changing may cause an effect (e.g., a waveform) similar to that of a magnetic field that is generated when a magnetic card corresponding to the card information associated with the received signal is swiped through a card reader of the electronic device 1302. According to an embodiment, for example, payment-related information and a control signal that are received by the electronic device 1302 in the form of the magnetic signal may be further transmitted to an external server 1308 (e.g., a payment server) via the network 1399.

The NFC communication module 1430 may obtain a signal containing control information or payment information such as card information from the processor 1320 and transmit the obtained signal to the external electronic device 1302 via the NFC antenna 1497-3. According to an embodiment, the NFC communication module 1430 may receive such a signal transmitted from the external electronic device 1302 via the NFC antenna 1497-3.

The wireless charging module 1450 may wirelessly transmit power to the external electronic device 1302 (e.g., a cellular phone or wearable device) via the wireless charging antenna 1497-5, or wirelessly receive power from the external electronic device 1302 (e.g., a wireless charging device). The wireless charging module 1450 may support one or more of various wireless charging schemes including, for example, a magnetic resonance scheme or a magnetic induction scheme.

According to one embodiment, some of the MST antenna 1497-1, the NFC antenna 1497-3, or the wireless charging antenna 1497-5 may share at least part of their radiators. For example, the radiator of the MST antenna 1497-1 may be used as the radiator of the NFC antenna 1497-3 or the wireless charging antenna 1497-5, or vice versa. In such a case, the antenna module 1397 may include a switching circuit adapted to selectively connect (e.g., close) or disconnect (e.g. open) at least part of the antennas 1497-1, 1497-3, or 1497-5, for example, under the control of the wireless communication module 1392 (e.g., the MST communication module 1410 or the NFC communication module 1430) or the power management module (e.g., the wireless charging module 1450). For example, when the electronic device 1301 uses a wireless charging function, the NFC communication module 1430 or the wireless charging module 1450 may control the switching circuit to temporarily disconnect at least one portion of the radiators shared by the NFC antenna 1497-3 and the wireless charging antenna 1497-5 from the NFC antenna 1497-3 and to connect the at least one portion of the radiators with the wireless charging antenna 1497-5.

According to an embodiment, at least one function of the MST communication module 1410, the NFC communication module 1430, or the wireless charging module 1450 may be controlled by an external processor (e.g., processor 1320). At least one specified function (e.g., a payment function) of the MST communication module 1410 or the NFC communication module 1430 may be performed in a trusted execution environment (TEE). The TEE may form an execution environment in which, for example, at least some designated area of the memory 1330 is allocated to be used for performing a function (e.g., a financial transaction or personal information-related function) that requires a relatively high level of security. In such a case, access to the at least some designated area of the memory 1330 may be restrictively permitted, for example, according to an entity accessing thereto or an application being executed in the TEE.

Figure 15A:
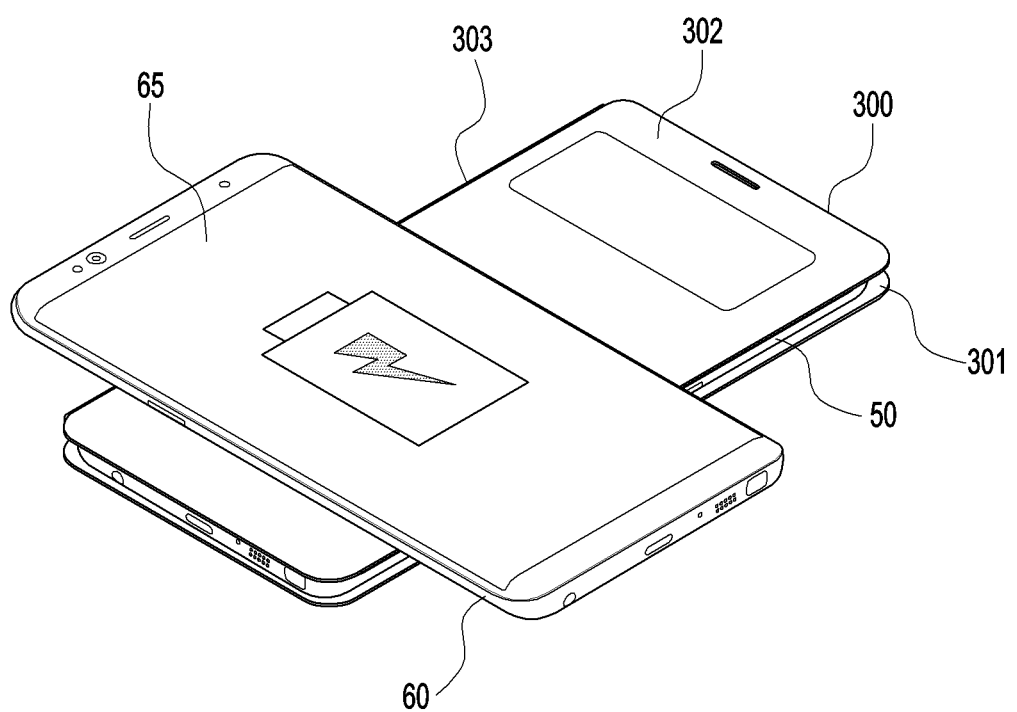
FIGS. 15A and 15B are diagrams illustrating a process in which wireless charging is performed between electronic devices through an accessory device, according to an embodiment.
Figure 15B:
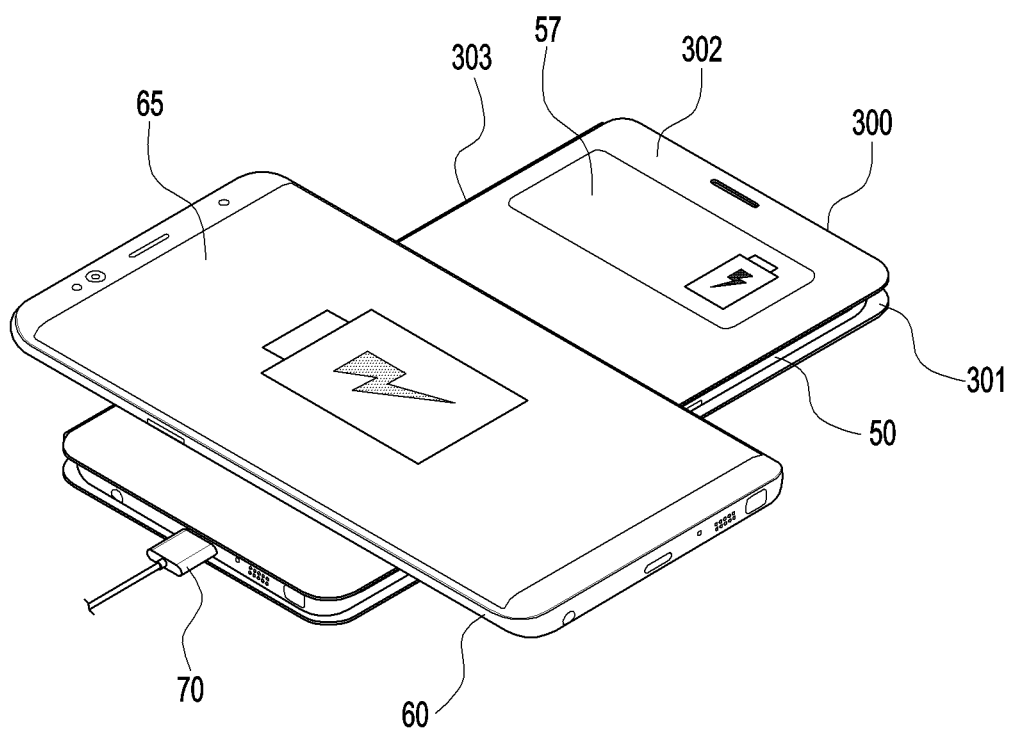

FIGS. 15A and 15B are diagrams illustrating a process in which wireless charging is performed between electronic devices through an accessory device, according to an embodiment. The electronic device 50 may be coupled to the accessory device 300 and the accessory device 300 may include the first cover 301, the second cover 302, and the connection portion 303.

The electronic device 60 may be brought in contact with at least a portion of the first cover 301 or the second cover 302 of the accessory device 300 coupled to the electronic device 50. The electronic device 50 may transmit wireless power to the electronic device 60 in contact with the at least a portion of the first cover 301 or the second cover 302 of the accessory device 300. For example, when the mode of the electronic device 50 is set to a mode capable of transmitting wireless power to another electronic device, the electronic device 50 may transmit wireless power to the electronic device 60 in contact with at least a portion of the first cover 301 or the second cover 302 of the accessory device 300.

Referring to FIG. 15A, the electronic device 60 is placed on the second cover 302 of the accessory device 300. In this case, the wireless power generated by the electronic device 50 coupled to the accessory device 300 may be transmitted to the electronic device 60 through a coil device (e.g., 600 of FIG. 6A) provided inside the accessory device 300. During wireless charging, an interface associated with charging may be displayed on the display 65 of the electronic device 60.

According to an embodiment, even when the electronic device 50 is being charged in a wired or wireless manner, the electronic device 50 may transmit wireless power to the electronic device 60 in contact with at least a portion of the first cover 301 or the second cover 302 of the accessory device 300.

The electronic device 50 which is being charged in a wired manner is shown in FIG. 15B.

Referring to FIG. 15B, the electronic device 50 may receive power from outside the electronic device 50 and the electronic device 60 (i.e., from a power outlet) through a charging connector 70 and may charge the battery of the electronic device 50 using the received power. At the same time, the electronic device 50 may transmit wireless power to the electronic device 60 in contact with at least a portion of the first cover 301 or the second cover 302 of the accessory device 300.

The second cover 302 of the accessory device 300 may include at least one window 57. At least a portion of the display 55 of the electronic device 50 may be output through the at least one window 57. Alternatively, the at least one window 57 may be configured as a separate display from the display of the electronic device 50. In this case, the display constituting the at least one window 57 may display information associated with the electronic device 50.

FIGS. 16A to 16E are diagrams illustrating a process in which wireless charging is performed between electronic devices through an accessory device, according to an embodiment. The electronic device 50 may be coupled to the accessory device 300. The accessory device 300 may include the first cover 301, the second cover 302, and the connection portion 303. In addition, at least a portion of the second cover 302 of the accessory device 300 may also be provided with at least one window 304. The at least one window 304 may be made of a transparent or opaque material and may be used to identify at least a portion of the display 55 of the electronic device 50. In addition, the at least one window 304 may be composed of at least one display to display information associated with the electronic device 50.

A user interface associated with wireless charging may be displayed on the display 55 of the electronic device 50. The user interface may include state information of the electronic device 50 and state information of another electronic device that can be connected to the electronic device 50. In addition, the user interface may include at least one button 56 that can change a setting of the electronic device 50.

Figure 16A:
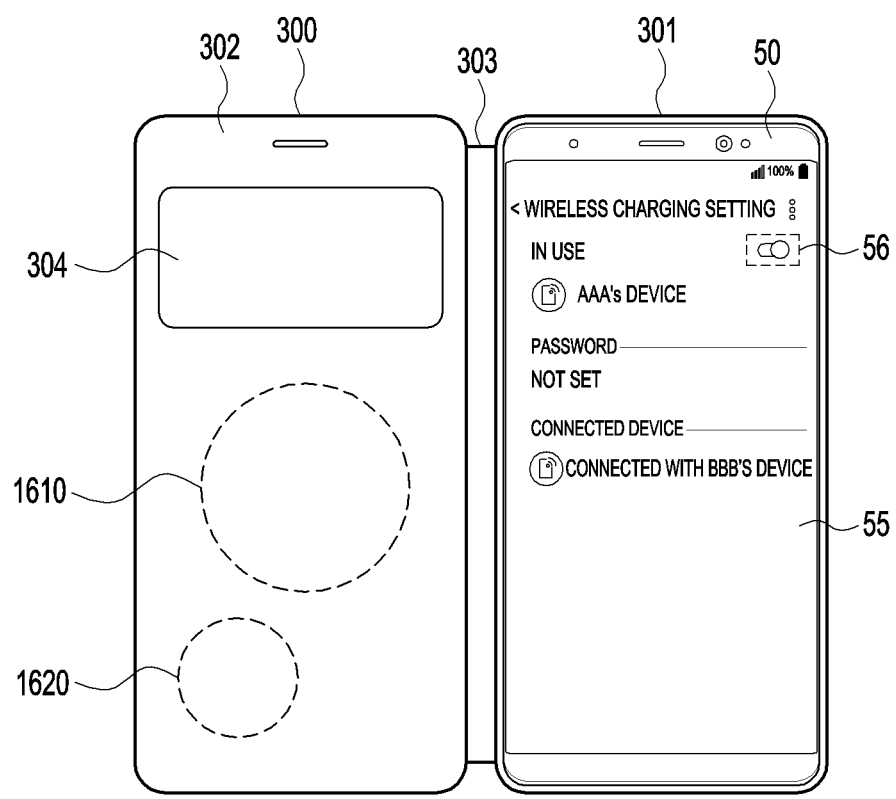
FIGS. 16A to 16E are diagrams illustrating a process in which wireless charging is performed between electronic devices through an accessory device, according to an embodiment.

The second cover 302 of the accessory device 300 may include at least one coil constituting a coil device (e.g., 600 of FIG. 6A). For example, the second cover 302 of the accessory device 300 may include a plurality of coils having different sizes among the coils constituting the coil device (e.g., 600 of FIG. 6A). Referring to FIG. 16A, the second cover 302 of the accessory device 300 may include a first coil 1610 and a second coil 1620 having a different size or inductance than the first coil 1610.

The first coil 1610 may be used to supply wireless power to a large electronic device and the second coil 1620 may be used to supply wireless power to a small electronic device. For example, the electronic device 50 coupled to the accessory device 300 may transmit wireless power to a relatively large electronic device, such as a smart phone, via the first coil 1610. In addition, the electronic device 50 coupled to the accessory device 300 may transmit wireless power to a relatively small electronic device, such as a smart watch, via the second coil 1620.

Figure 16B:
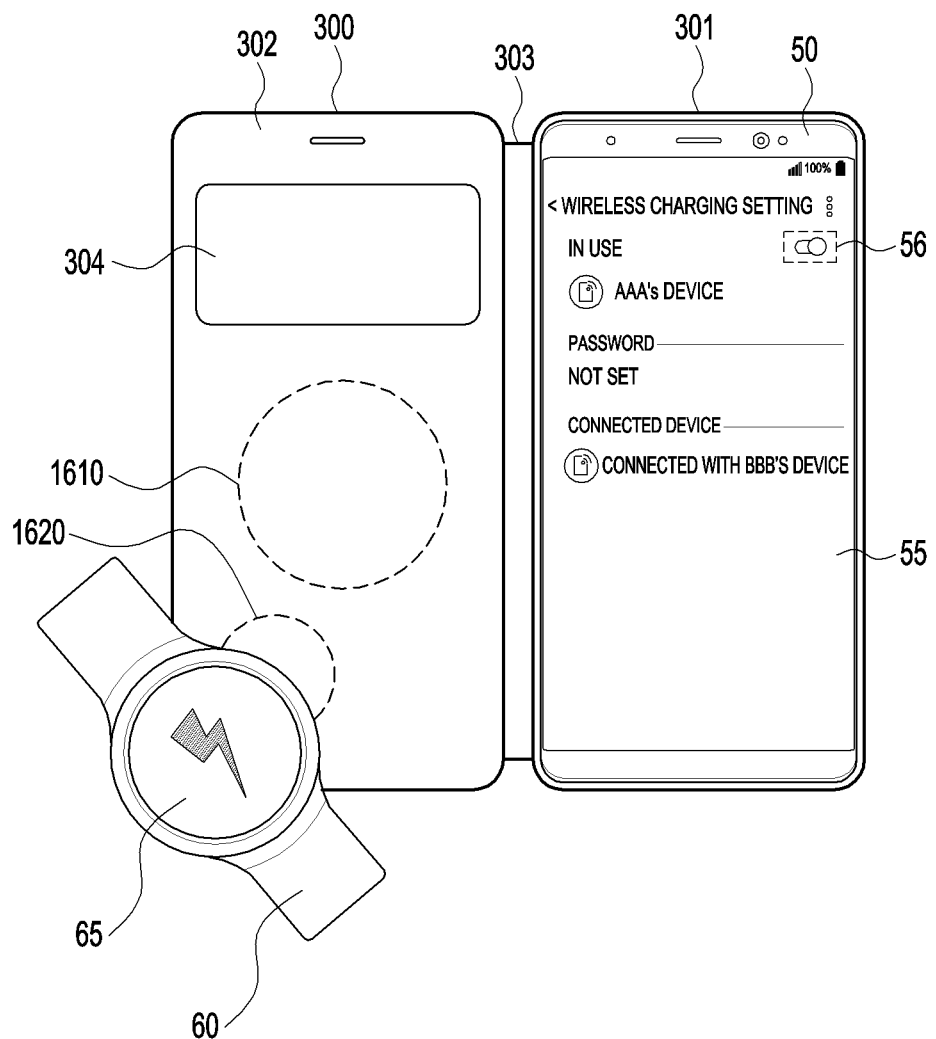
Figure 16C:
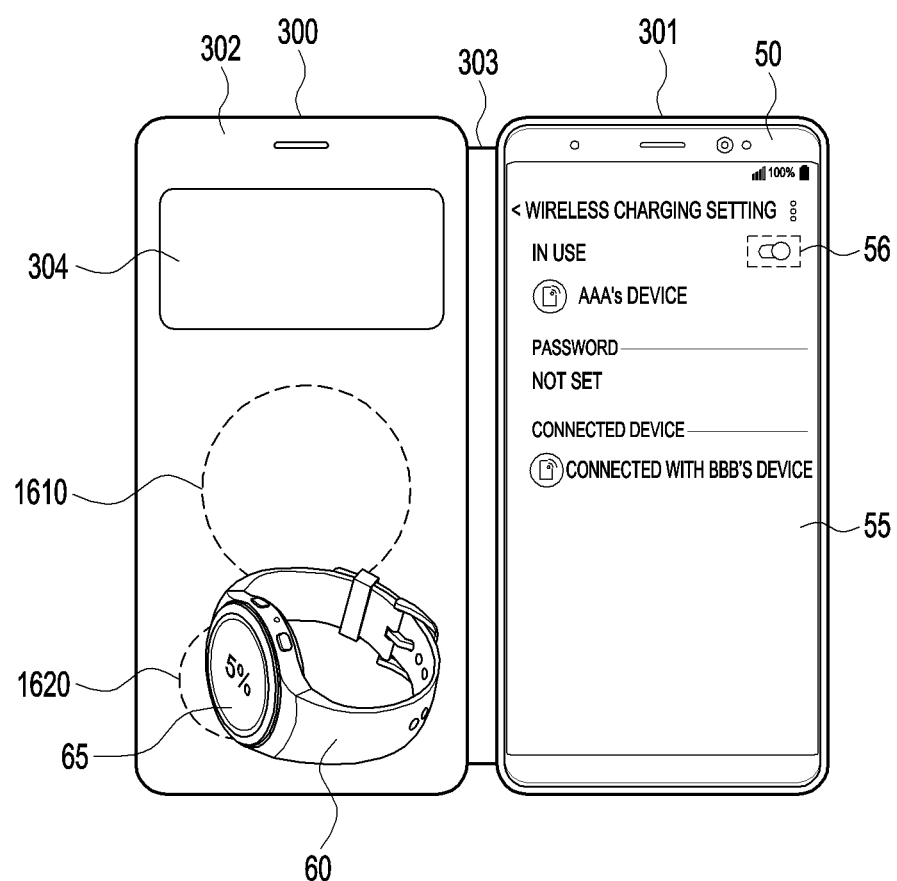
Figure 16D:
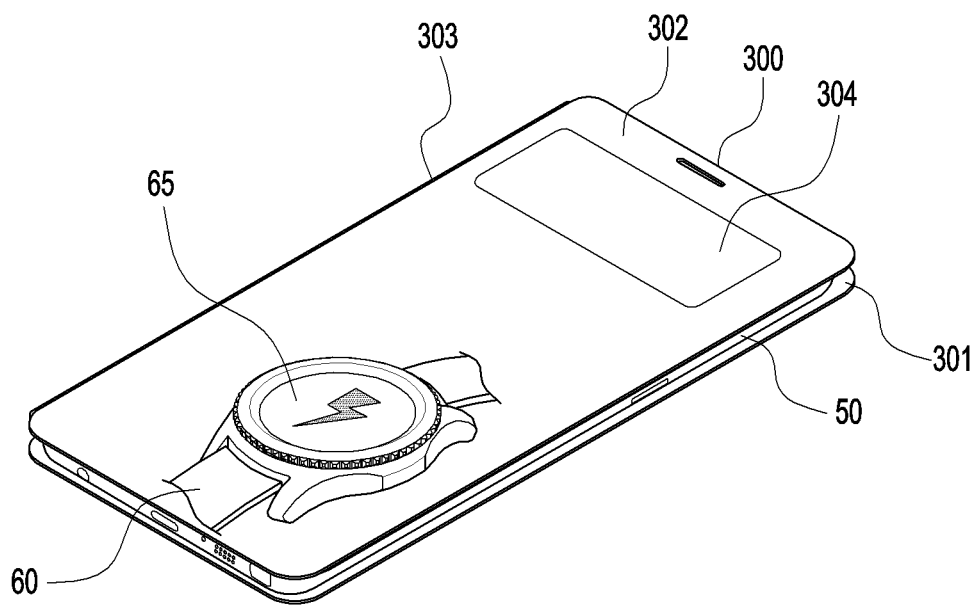
Figure 16E:
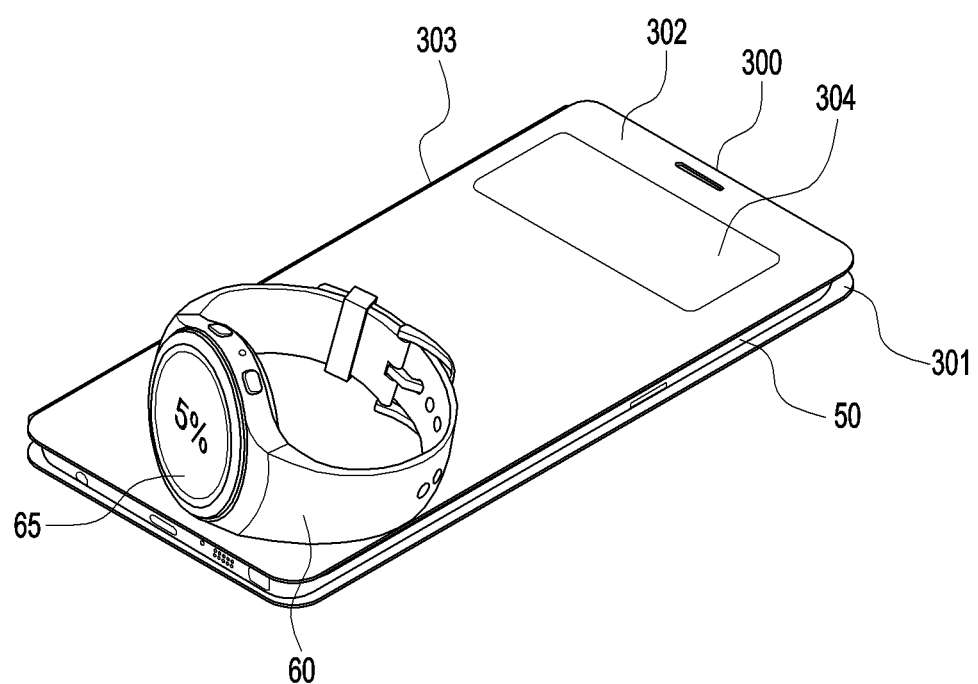

The electronic device 50 may transmit wireless power to the electronic device 60 in contact with the at least a portion of the first cover 301 or the second cover 302 of the accessory device 300, using the first coil 1610 or the second coil 1620. For example, as shown in FIGS. 16B and 16C, the electronic device 50 may transmit wireless power to the electronic device 60 placed on at least a portion of a first surface of the second cover 302 of the accessory device 300. In addition, as shown in FIGS. 16D and 16E, the electronic device 50 may transmit wireless power to the electronic device 60 placed on at least a portion of a second surface of the second cover 302 of the accessory device 300.

The electronic device 60 that receives the wireless power from the electronic device 50 may include at least one display 65, and an interface associated with charging may be displayed on the display 65 of the electronic device 60.

According to an embodiment, a method of controlling a coil device for transmitting wireless power may include selecting one of a first mode and a second mode based on a control signal received from an external electronic device; controlling at least one switch of the coil device so that an inductance of a first coil of the coil device is a first inductance and controlling the at least one switch so that the first coil and a second coil of the coil device are connected to each other and the first coil and a third coil of the coil device are not connected to each other, in response to the selection of the first mode; and controlling the at least one switch so that the inductance of the first coil is a second inductance and controlling the at least one switch so that the first coil and the third coil are connected to each other and the first coil and the second coil are not connected to each other, in response to the selection of the second mode.

In a computer-readable recording medium in which a program for executing the method of controlling the coil device for transmitting wireless power is recorded, the method may include selecting one of a first mode and a second mode based on a control signal received from an external electronic device; controlling at least one switch of the coil device so that an inductance of a first coil of the coil device is a first inductance and controlling the at least one switch so that the first coil and a second coil of the coil device are connected to each other and the first coil and a third coil of the coil device are not connected to each other, in response to the selection of the first mode; and controlling the at least one switch so that the inductance of the first coil is a second inductance and controlling the at least one switch so that the first coil and the third coil are connected to each other and the first coil and the second coil are not connected to each other, in response to the selection of the second mode.

Thus, power can be transmitted and received wirelessly between electronic devices using the coil device. Thereby, even when there is no wired or wireless charger, power may be wirelessly received from another electronic device to charge the battery of the electronic device.

When using the accessory device while power is transmitted and received wirelessly between electronic devices, it is not necessary for a display of any one of the electronic devices to face the floor. Therefore the connection state between the electronic devices and the charging state of other electronic devices can easily be confirmed through a display.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A coil device for transmitting wireless power, the coil device comprising:
   at least one switch;
   a first coil;
   a second coil configured to be physically connected to the first coil through the at least one switch;

a third coil configured to be physically connected to the first coil through the at least one switch; and
a logic circuit configured to control the at least one switch,
wherein, in a first mode, the logic circuit is configured to control the at least one switch so that an inductance of the first coil is a first inductance and control the at least one switch so that the first coil and the second coil are connected to each other and the first coil and the third coil are not connected to each other, and
wherein, in a second mode, the logic circuit is configured to control the at least one switch so that the inductance of the first coil is a second inductance and control the at least one switch so that the first coil and the third coil are connected to each other and the first coil and the second coil are not connected to each other.

2. The coil device of claim 1, wherein the logic circuit is configured to control the at least one switch according to one of the first mode and the second mode based on a control signal received from an external electronic device.

3. The coil device of claim 2, wherein the control signal includes a signal generated by a communication module of the external electronic device.

4. The coil device of claim 1, wherein a magnitude of the first inductance is different from a magnitude of an inductance of the second coil.

5. The coil device of claim 1, wherein a magnitude of the second inductance is different from a magnitude of an inductance of the third coil.

6. The coil device of claim 1,
wherein, in the first mode, the second coil is configured to generate a first induction current based on a first electromagnetic field received from outside the coil device, and the first coil is configured to:
receive the first induction current generated by the second coil, and
transmit a second electromagnetic field to outside the coil device.

7. The coil device of claim 1,
wherein, in the second mode, the first coil is configured to generate a first induction current based on a first electromagnetic field received from outside the coil device, and the third coil is configured to:
receive the first induction current generated by the first coil, and
transmit a second electromagnetic field to outside the coil device.

8. The coil device of claim 1, further comprising:
at least one shielding layer configured to be disposed between a first plane including the first coil and a second plane including the second coil.

9. An accessory device for covering an electronic device, the accessory device comprising:
a cover unit configured to include a first cover for covering at least a portion of a first surface of the electronic device, a second cover for covering at least a portion of a second surface of the electronic device positioned opposite the first surface, and a connection portion for connecting the first cover and the second cover;
a first coil and a second coil configured to be disposed inside the first cover;
a third coil configured to be disposed inside the second cover; and
a circuit unit configured to be electrically connected to the first coil, the second coil, and the third coil.

10. The accessory device of claim 9,
wherein a first layer including the first coil and a second layer including the second coil are disposed parallel to the inside of the first cover, and
wherein the first coil is disposed closer to the first surface of the electronic device than the second coil.

11. The accessory device of claim 10, further comprising:
at least one shielding layer configured to be disposed between the first coil and the second coil.

12. The accessory device of claim 9,
wherein the circuit unit includes at least one switch and a logic circuit,
wherein, in a first mode, the logic circuit is configured to control the at least one switch so that an inductance of the first coil is a first inductance and control the at least one switch so that the first coil and the second coil are connected to each other and the first coil and the third coil are not connected to each other, and
wherein, in a second mode, the logic circuit is further configured to control the at least one switch so that the inductance of the first coil is a second inductance and control the at least one switch so that the first coil and the third coil are connected to each other and the first coil and the second coil are not connected to each other.

13. The accessory device of claim 12, wherein the logic circuit is further configured to control the at least one switch according to one of the first mode and the second mode based on a control signal received from the electronic device.

14. The accessory device of claim 13, wherein the control signal includes a signal generated by a communication module of the electronic device.

15. The accessory device of claim 12,
wherein a magnitude of the first inductance is different from a magnitude of an inductance of the second coil, and
wherein the magnitude of the second inductance is different from a magnitude of an inductance of the third coil.

16. The accessory device of claim 12, wherein the third coil includes one coil or a plurality of coils having different sizes.

17. The accessory device of claim 12,
wherein, in the first mode, the second coil is configured to generate a first induction current based on a first electromagnetic field received from outside the accessory device, and the first coil is configured to:
receive the first induction current generated by the second coil,
generate a second electromagnetic field, and
transmit the generated second electromagnetic field to the electronic device.

18. The accessory device of claim 12,
wherein, in the second mode, the first coil is configured to generate a first induction current based on a first electromagnetic field received from the electronic device, and the third coil is configured to:
receive the first induction current generated by the first coil,
generate a second electromagnetic field, and
transmit the generated second electromagnetic field to an external electronic device positioned on the second cover.

19. An accessory device for covering an electronic device, the accessory device comprising:
a case configured to house the electronic device and to cover at least a portion of a first surface of the electronic device;

a first coil configured to be disposed inside the case;

a second coil configured to be spaced apart from the first coil in the case and to be positioned below the first coil; and a connection portion configured to physically connect the first coil and the second coil, wherein the first coil is configured to be positioned between the first surface of the electronic device and the second coil when the case covers at least the portion of the first surface of the electronic device, and wherein an inductance of the first coil is lower than an inductance of the second coil.

20. The accessory device of claim 19, wherein a first end of the first coil and a first end of the second coil are connected to a first lead wire and a second end of the first coil and a second end of the second coil are connected to a second lead wire.

\* \* \* \* \*